(12) United States Patent
Omura et al.

(10) Patent No.: US 10,407,758 B2
(45) Date of Patent: Sep. 10, 2019

(54) STEEL FOR OIL COUNTRY TUBULAR GOODS AND METHOD OF PRODUCING THE SAME

(71) Applicant: NIPPON STEEL & SUMITOMO METAL CORPORATION, Tokyo (JP)

(72) Inventors: Tomohiko Omura, Tokyo (JP); Yuji Arai, Tokyo (JP); Kaori Kawano, Tokyo (JP); Akihiro Sakamoto, Tokyo (JP); Kazuo Okamura, Tokyo (JP); Kenji Yamamoto, Tokyo (JP); Keiichi Kondo, Tokyo (JP); Koji Nagahashi, Tokyo (JP); Masanao Seo, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 95 days.

(21) Appl. No.: 14/408,351

(22) PCT Filed: Jun. 17, 2013

(86) PCT No.: PCT/JP2013/066585
§ 371 (c)(1),
(2) Date: Dec. 16, 2014

(87) PCT Pub. No.: WO2013/191131
PCT Pub. Date: Dec. 27, 2013

(65) Prior Publication Data
US 2015/0114527 A1     Apr. 30, 2015

(30) Foreign Application Priority Data

Jun. 20, 2012 (JP) .................................. 2012-138650

(51) Int. Cl.
*C22C 38/32*     (2006.01)
*C21D 8/10*      (2006.01)
(Continued)

(52) U.S. Cl.
CPC ................ *C22C 38/32* (2013.01); *C21D 1/18* (2013.01); *C21D 1/20* (2013.01); *C21D 1/25* (2013.01);
(Continued)

(58) Field of Classification Search
CPC ... C21D 1/18; C21D 1/20; C21D 1/25; C21D 8/10; C21D 9/08; C22C 38/00;
(Continued)

(56) References Cited

U.S. PATENT DOCUMENTS 5,938,865 A * 8/1999 Kondo .................... B21B 23/00
                                                148/593
2002/0104592 A1* 8/2002 Sakamoto ................ C21D 1/18
                                                148/320

(Continued)

FOREIGN PATENT DOCUMENTS

CA          2599868          9/2006
CA          2754123          9/2010
(Continued)

OTHER PUBLICATIONS

C.E. Bates, G.E. Totten, and R.L. Brennan, Quenching of Steel, Heat Treating, vol. 4, ASM Handbook, ASM International, 1991, p. 67-120 (Year: 1991).*

(Continued)

*Primary Examiner* — Colleen P Dunn
*Assistant Examiner* — Nicholas A Wang
(74) *Attorney, Agent, or Firm* — Clark & Brody

(57) ABSTRACT

A steel for oil country tubular goods includes, as a chemical composition, by mass %, C, Si, Mn, Al, Mo, P, S, O, N, and a balance containing Fe and impurities, wherein a full width at half maximum HW of a crystal plane corresponding to a (211) crystal plane of an α phase and a carbon content expressed in mass % in the chemical composition satisfy (Continued)

HW×C$^{1/2}$≤0.38, the carbon content and a molybdenum content expressed in mass % in the chemical composition satisfy C×Mo≥0.6, a number of M$_2$C carbides having a hexagonal crystal structure and having an equivalent circle diameter of 1 nm or more is 5 pieces or more per one square micron, and an yield strength is 758 MPa or more.

5 Claims, 4 Drawing Sheets

(51) Int. Cl.

| | | |
|---|---|---|
| C21D 9/08 | (2006.01) | |
| C22C 38/00 | (2006.01) | |
| C22C 38/12 | (2006.01) | |
| C22C 38/02 | (2006.01) | |
| C22C 38/04 | (2006.01) | |
| C22C 38/06 | (2006.01) | |
| C22C 38/14 | (2006.01) | |
| C22C 38/22 | (2006.01) | |
| C22C 38/24 | (2006.01) | |
| C22C 38/26 | (2006.01) | |
| C22C 38/28 | (2006.01) | |
| C21D 1/20 | (2006.01) | |
| C21D 1/25 | (2006.01) | |
| C21D 1/18 | (2006.01) | |
| C21D 6/00 | (2006.01) | |
| C21D 8/00 | (2006.01) | |

(52) U.S. Cl.
CPC ............ *C21D 6/002* (2013.01); *C21D 6/005* (2013.01); *C21D 6/008* (2013.01); *C21D 8/005* (2013.01); *C21D 8/10* (2013.01); *C21D 9/08* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/24* (2013.01); *C22C 38/26* (2013.01); *C22C 38/28* (2013.01); *C21D 2211/002* (2013.01); *C21D 2211/005* (2013.01); *C21D 2211/008* (2013.01)

(58) Field of Classification Search
CPC ..... C22C 38/001; C22C 38/002; C22C 38/02; C22C 38/04; C22C 38/06; C22C 38/12; C22C 38/14; C22C 38/22; C22C 38/24
See application file for complete search history.

(56) References Cited

U.S. PATENT DOCUMENTS

| | | | |
|---|---|---|---|
| 2009/0098403 A1* | 4/2009 | Omura | C21D 8/12 428/586 |
| 2009/0285713 A1 | 11/2009 | Omura et al. | |
| 2011/0315276 A1* | 12/2011 | Bosch | C22C 38/22 148/334 |
| 2012/0186704 A1* | 7/2012 | Eguchi | C21D 9/14 148/500 |
| 2013/0061988 A1* | 3/2013 | Delattre | C22C 38/02 148/334 |

FOREIGN PATENT DOCUMENTS

| | | |
|---|---|---|
| CA | 2766028 | 12/2010 |
| CA | 2849287 | 9/2013 |
| CN | 101343715 | 1/2009 |
| EP | 1862561 | 12/2007 |
| EP | 1 911 857 | 4/2008 |
| EP | 2447386 | 5/2012 |
| EP | 2824198 | 1/2015 |
| FR | 2960883 | 12/2011 |
| JP | 59-232220 | 12/1984 |
| JP | 62-253720 | 11/1987 |
| JP | 06-322478 | 11/1994 |
| JP | 08-311551 | 11/1996 |
| JP | 11-286720 | 10/1999 |
| JP | 11-335731 | 12/1999 |
| JP | 2000-119798 | 4/2000 |
| JP | 2000-178682 | 6/2000 |
| JP | 2000-256783 | 9/2000 |
| JP | 2000-297344 | 10/2000 |
| JP | 2000-313919 | 11/2000 |
| JP | 2005-350754 | 12/2005 |
| JP | 2006-265657 | 10/2006 |
| JP | 2007-016291 | 1/2007 |
| JP | 2011246798 | * 12/2011 |
| JP | 2012-026030 | 2/2012 |
| UA | 82022 | 2/2008 |
| UA | 82007 | 8/2008 |
| WO | 2007/007678 | 1/2007 |
| WO | 2010/150915 | 12/2010 |
| WO | 2011/111872 | 9/2011 |

OTHER PUBLICATIONS

Yamasaki, S. "Modelling precipitation of carbides in martensitic steel." University of Cambridge. (Year: 2004).*
Canadian Office Action for Application No. 2,872,854 dated May 31, 2016.
European Search Report dated Jul. 20, 2015.
Ukrainian Notice of Allowance for Application No. a201413584, dated May 12, 2017.
International Search Report for PCT/JP2013/066585 dated Sep. 10, 2013.
Brazilian Office Action for Application No. BR112014030346-0, dated Jan. 29, 2019, with a brief English translation.

* cited by examiner

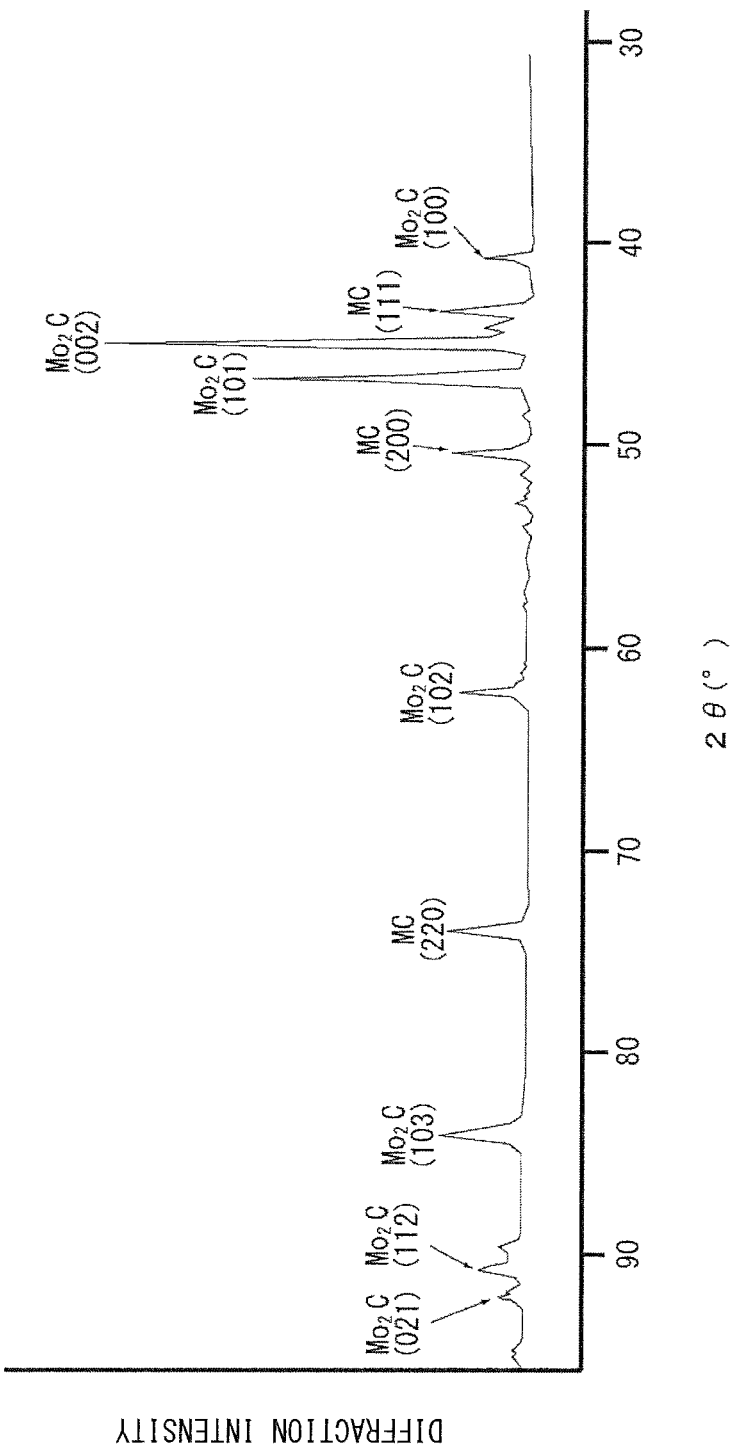

STEEL FOR OIL COUNTRY TUBULAR GOODS AND METHOD OF PRODUCING THE SAME

TECHNICAL FIELD

The present invention relates to steel for oil country tubular goods, and a method of producing the same. Particularly, the present invention relates to low-alloy steel for oil country tubular goods which is used for oil country tubular goods such as a casing, a tubing, and the like for an oil-well and a gas-well, and a method of producing the same.

Priority is claimed on Japanese Patent Application No. 2012-138650, filed Jun. 20, 2012, the content of which is incorporated herein by reference.

BACKGROUND ART

For oil country tubular goods, high-strengthening is demanded with deepening wells such as the oil-wells and the gas-wells (hereinafter, collectively simply referred to as an "oil-well"). Conventionally, oil country tubular goods of 80 ksi grade (yield strength is 80 to 95 ksi, that is, 551 to 654 MPa) or 95 ksi grade (yield strength is 95 to 110 ksi, that is, 654 to 758 MPa) have been widely used. However, in recent years, oil country tubular goods of 110 ksi grade (yield strength is 110 to 125 ksi, that is, 758 to 862 MPa) is starting to be used.

Furthermore, most of deep wells, which are developed in recent years, contain hydrogen sulfide having corrosivity. Therefore, it is necessary for the oil country tubular goods to have not only high strength but also sulfide stress cracking resistance (hereinafter, referred to as SSC resistance).

Methods in which steel is purified or a steel structure is refined are known as an improvement plan for the SSC resistance of the conventional oil country tubular goods of 95 to 110 ksi grade. For example, Japanese Unexamined Patent Application, First Publication No. S62-253720 suggests a method of improving the SSC resistance by reducing impurity elements such as Mn, P, and the like. Japanese Unexamined Patent Application, First Publication No. S59-232220 suggests a method of improving the SSC resistance by carrying out a quenching treatment twice to refine crystal grains.

In response to the demand for the high-strengthening of the oil country tubular goods, in recent years, steel for oil country tubular goods of 125 ksi grade (yield strength is 862 to 965 MPa) has been suggested. However, the sulfide stress cracking (SSC) tends to occurs with an increase in the strength. Therefore, with regard to steel for oil country tubular goods of 125 ksi grade or higher, a further improvement in the SSC resistance is required as compared to the conventional steel for oil country tubular goods of 95 ksi grade or 110 ksi grade.

Japanese Unexamined Patent Application, First Publication No. H6-322478, Japanese Unexamined Patent Application, First Publication No. H8-311551, Japanese Unexamined Patent Application, First Publication No. H11-335731, Japanese Unexamined Patent Application, First Publication No. 2000-178682, Japanese Unexamined Patent Application, First Publication No. 2000-256783, Japanese Unexamined Patent Application, First Publication No. 2000-297344, Japanese Unexamined Patent Application, First Publication No. 2000-119798, Japanese Unexamined Patent Application, First Publication No. 2005-350754, Japanese Unexamined Patent Application, First Publication No. 2006-265657, Japanese Unexamined Patent Application, First Publication No. 2000-313919, and PCT International Publication No. 2007/007678 suggest improvement plans for the SSC resistance of high-strength steel for oil country tubular goods.

Japanese Unexamined Patent Application, First Publication No. H6-322478 suggests a method of improving the SSC resistance of steel materials of 125 ksi grade by refining the steel structure through an induction-heating heat treatment. Japanese Unexamined Patent Application, First Publication No. H8-311551 suggests a method of improving the SSC resistance of steel pipes of 110 ksi grade to 140 ksi grade in a case of raising hardenability by using a direct quenching method and raising a tempering temperature. Japanese Unexamined Patent Application, First Publication No. H11-335731 suggests a method of improving the SSC resistance of low-alloy steel of 110 ksi grade to 140 ksi grade through an adjustment to an optimal alloy component. Japanese Unexamined Patent Application, First Publication No. 2000-178682, Japanese Unexamined Patent Application, First Publication No. 2000-256783, and Japanese Unexamined Patent Application, First Publication No. 2000-297344 suggest a method of improving the SSC resistance of low-alloy steel for oil country tubular goods of 110 ksi grade to 140 ksi grade by controlling the morphology of carbides. Japanese Unexamined Patent Application, First Publication No. 2000-119798 suggests a method of retarding an SSC occurrence time of steel materials of 110 ksi grade to 125 ksi grade by allowing fine V carbides to sufficiently precipitate. Japanese Unexamined Patent Application, First Publication No. 2005-350754 suggests a method of improving the SSC resistance of oil country tubular goods of 125 ksi grade or higher by controlling dislocation density and a hydrogen diffusion coefficient to desired values. Japanese Unexamined Patent Application, First Publication No. 2006-265657 suggests a method of improving the SSC resistance of steel for oil country tubular goods of 125 ksi grade or higher by allowing a large amount of C to be contained, stopping water cooling at 400 to 600° C. during the water cooling, and carrying out an isothermal transformation heat treatment (austempering treatment) at 400 to 600° C. to form a bainite single-phase structure. Japanese Unexamined Patent Application, First Publication No. 2000-313919 and PCT International Publication No. 2007/007678 discloses a method of improving the SSC resistance of steel pipes by increasing Mo content as compared to conventional oil country tubular goods.

RELATED ART DOCUMENTS

Patent Documents

[Patent Document 1] Japanese Unexamined Patent Application, First Publication No. S62-253720
[Patent Document 2] Japanese Unexamined Patent Application, First Publication No. S59-232220
[Patent Document 3] Japanese Unexamined Patent Application, First Publication No. H6-322478
[Patent Document 4] Japanese Unexamined Patent Application, First Publication No. H8-311551
[Patent Document 5] Japanese Unexamined Patent Application, First Publication No. H11-335731
[Patent Document 6] Japanese Unexamined Patent Application, First Publication No. 2000-178682
[Patent Document 7] Japanese Unexamined Patent Application, First Publication No. 2000-256783
[Patent Document 8] Japanese Unexamined Patent Application, First Publication No. 2000-297344

[Patent Document 9] Japanese Unexamined Patent Application, First Publication No. 2000-119798

[Patent Document 10] Japanese Unexamined Patent Application, First Publication No. 2005-350754

[Patent Document 11] Japanese Unexamined Patent Application, First Publication No. 2006-265657

[Patent Document 12] Japanese Unexamined Patent Application, First Publication No. 2000-313919

[Patent Document 13] PCT International Publication No. 2007/007678

DISCLOSURE OF INVENTION

Problems to be Solved by Invention

As described above, in recent years, a further improvement in SSC resistance of steel for oil country tubular goods of 110 ksi grade (yield strength is 758 MPa or more) or 125 ksi grade or higher (yield strength is 862 MPa or more) has been required. This is because oil-wells and gas-wells currently in use contain a large amount of hydrogen sulfide. For example, Japanese Unexamined Patent Application, First Publication No. 2005-350754 and Japanese Unexamined Patent Application, First Publication No. 2006-265657 disclose steel for oil country tubular goods which has yield strength of 125 ksi grade and whch is excellent in the SSC resistance. However, all of test baths used for an SSC resistance evaluation test are test baths in which hydrogen sulfide of 0.1 atm is saturated. Therefore, in high-strength steel for oil country tubular goods, the excellent SSC resistance is required even in a test bath in which hydrogen sulfide of further high pressure is saturated.

In addition, the conventional oil country tubular goods having yield strength of 110 ksi grade or higher are not suitable for use in tubing pipes. Oil country tubular goods having yield strength of 95 ksi grade or lower are used in casing pipes and tubing pipes. However, in the oil country tubular goods having yield strength of 110 ksi grade or higher, the SSC resistance in a case where notch is applied (stress intensity factor $K_{ISSC}$ value in a hydrogen sulfide environment) is lowered. Therefore, in a case where the conventional oil country tubular goods of 110 ksi grade or higher is used as a tubing pipe that is directly exposed to a production fluid, SSC may occur from a latent defect or latent pitting corrosion as a starting point. Accordingly, with regard to the steel for oil country tubular goods having strength of 110 ksi grade or higher, it is preferable that the $K_{ISSC}$ value be high in order to be applied to the tubing pipes.

The present invention is to provide low-alloy steel for oil country tubular goods excellent in SSC resistance. Specifically, the present invention is to provide the low-alloy steel for oil country tubular goods, which has the yield strength (0.2% proof stress) of 110 ksi grade or higher (758 MPa or more) or 125 ksi grade or higher (862 MPa or more), and which is excellent in the SSC resistance containing the SSC resistance in the environment of high pressure hydrogen sulfide, the SSC resistance in the case where the notch is applied, and the like.

Solution to Problems

An aspect of the present invention employs the following.

(1) A low-alloy steel for oil country tubular goods according to an aspect of the invention includes, as a chemical composition, by mass %, C: more than 0.35% to 1.00%, Si: 0.05% to 0.5%, Mn: 0.05% to 1.0%, Al: 0.005% to 0.10%, Mo: more than 1.0% to 10%, P: 0.025% or less, S: 0.010% or less, O: 0.01% or less, N: 0.03% or less, Cr: 0% to 2.0%, V: 0% to 0.30%, Nb: 0% to 0.1%, Ti: 0% to 0.1%, Zr: 0% to 0.1%, Ca: 0% to 0.01%, B: 0% to 0.003%, and a balance consisting of Fe and impurities, wherein, when a full width at half maximum of a crystal plane corresponding to a (211) crystal plane of an α phase, which is obtained by an X-ray diffraction, is an HW in unit of °, the full width at half maximum HW and a carbon content expressed in mass % in the chemical composition satisfy a following Expression 1, the carbon content and a molybdenum content expressed in mass % in the chemical composition satisfy a following Expression 2, a number of M$_2$C carbides having a hexagonal crystal structure and having an equivalent circle diameter of 1 nm or more is 5 pieces or more per one square micron, and an yield strength is 758 MPa or more.

$$HW \times C^{1/2} \leq 0.38 \quad \text{(Expression 1)}$$

$$C \times Mo \geq 0.6 \quad \text{(Expression 2)}$$

The low-alloy steel for oil country tubular goods according to the aspect of the invention has excellent SSC resistance.

(2) In the low-alloy steel for oil country tubular goods according to (1), the steel may include, as the chemical composition, by mass %, Cr: 0.1% to 2.0%.

(3) In the low-alloy steel for oil country tubular goods according to (1) or (2), the steel may include, as the chemical composition, by mass %, V: 0.05% to 0.30%.

(4) In the low-alloy steel for oil country tubular goods according to any one of (1) to (3), the steel may include, as the chemical composition, by mass %, at least one of Nb: 0.002% to 0.1%, Ti: 0.002% to 0.1%, and Zr: 0.002% to 0.1%.

(5) In the low-alloy steel for oil country tubular goods according to any one of (1) to (4), the steel may include, as the chemical composition, by mass %, Ca: 0.0003% to 0.01%.

(6) In the low-alloy steel for oil country tubular goods according to any one of (1) to (5), the steel may include, as the chemical composition, by mass %, B: 0.0003% to 0.003%.

(7) A method of producing a low-alloy steel for oil country tubular goods according to an aspect of the invention includes: a hot-working process of hot-working a steel piece, which includes as a chemical composition by mass % C: more than 0.35% to 1.00%, Si: 0.05% to 0.5%, Mn: 0.05% to 1.0%, Al: 0.005% to 0.10%, Mo: more than 1.0% to 10%, P: 0.025% or less, S: 0.010% or less, O: 0.01% or less, N: 0.03% or less, Cr: 0% to 2.0%, V: 0% to 0.30%, Nb: 0% to 0.1%, Ti: 0% to 0.1%, Zr: 0% to 0.1%, Ca: 0% to 0.01%, B: 0% to 0.003%, and a balance consisting of Fe and impurities and in which a carbon content and a molybdenum content expressed in mass % in the chemical composition satisfy a following Expression 2, to obtain a steel material; a quenching process of quenching the steel material after the hot-working process; and a tempering process of tempering the steel material after the quenching process in a temperature range of 680° C. to an $A_{C1}$ point.

$$C \times Mo \geq 0.6 \quad \text{(Expression 2)}$$

(8) In the method of producing the low-alloy steel for oil country tubular goods according to (7), in the quenching process, the steel material after the hot-working process may be quenched by a continuous cooling under a condition where a time taken from a quenching start temperature to a martensite transformation start temperature is 100 seconds to 600 seconds.

(9) In the method of producing the low-alloy steel for oil country tubular goods according to (7), in the quenching process, as a first cooling treatment, the steel material after the hot-working process may be cooled under a condition where a cooling rate from a quenching start temperature to a temperature range of higher than an Ms point to 300° C. is 0.7° C./s or more, as an isothermal treatment, the steel material after the first cooling treatment may be hold under a condition in the temperature range of higher than the Ms point to 300° C., and as a second cooling treatment, the steel material after the isothermal treatment may be cooled.

(10) In the method of producing the low-alloy steel for oil country tubular goods according to any one of (7) to (9), in the quenching process, when a Rockwell hardness in C scale at a thickness central portion of the steel material after the quenching process and before the tempering process is an HRC, the steel material may be quenched under a condition where the Rockwell hardness HRC satisfies a following Expression 3.

$$HRC \geq 50 \times C + 26 \quad \text{(Expression 3)}$$

(11) The method of producing the low-alloy steel for oil country tubular goods according to any one of (7) to (10) may further include a normalizing process of normalizing the steel material after the hot-working process and before the quenching process.

(12) In the method of producing the low-alloy steel for oil country tubular goods according to any one of (7) to (11), the steel piece may include, as the chemical composition, by mass %, Cr: 0.1% to 2.0%.

(13) In the method of producing the low-alloy steel for oil country tubular goods according to any one of (7) to (12), the steel piece may include, as the chemical composition, by mass %, V: 0.05% to 0.30%.

(14) In the method of producing the low-alloy steel for oil country tubular goods according to any one of (7) to (13), the steel piece may include, as the chemical composition, by mass %, at least one of Nb: 0.002% to 0.1%, Ti: 0.002% to 0.1%, and Zr: 0.002% to 0.1%.

(15) In the method of producing the low-alloy steel for oil country tubular goods according to any one of (7) to (14), the steel piece may include, as the chemical composition, by mass %, Ca: 0.0003% to 0.01%.

(16) In the method of producing the low-alloy steel for oil country tubular goods according to any one of (7) to (15), the steel piece may include, as the chemical composition, by mass %, B: 0.0003% to 0.003%.

Advantageous Effects of Invention

The low-alloy steel for oil country tubular goods according to the aspect of the invention has excellent SSC resistance.

The low-alloy steel for oil country tubular goods produced by the aspect of the invention has excellent SSC resistance.

Specifically, it is possible to provide the low-alloy steel for oil country tubular goods, which has the yield strength (0.2% proof stress) of 110 ksi grade or higher (758 MPa or more) or 125 ksi grade or higher (862 MPa or more), and which is excellent in the SSC resistance containing the SSC resistance in the environment of high pressure hydrogen sulfide, the SSC resistance in the case where the notch is applied, and the like.

BRIEF DESCRIPTION OF DRAWINGS

FIG. 2 is a diffraction pattern of X-ray diffraction of carbides which are residue of electrolytic extraction of the low-alloy steel for oil country tubular goods according to the embodiment.

DESCRIPTION OF EMBODIMENTS

Figure 1A:
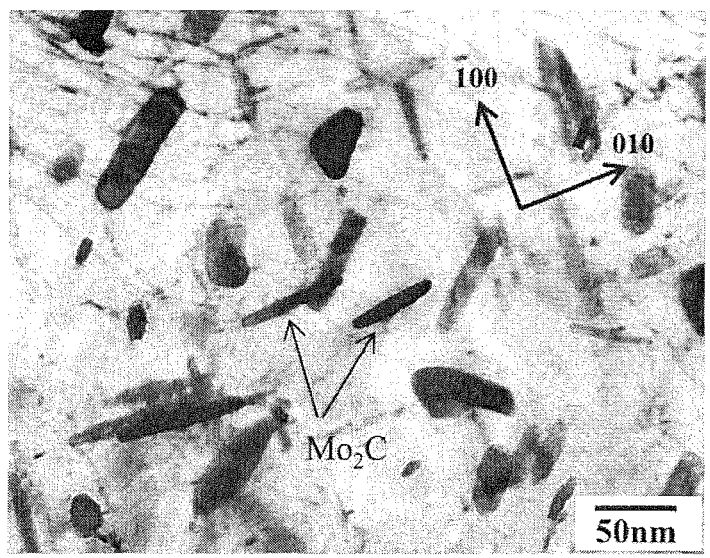
FIG. 1A is a micrograph of a transmission electron microscope of hexagonal $M_2C$ carbides which are contained in a low-alloy steel for oil country tubular goods according to an embodiment of the present invention.

Hereinafter, a preferable embodiment of the invention will be described in detail referring to the drawings. In the drawings, the same reference sign will be given to the same or corresponding parts in the drawings, and a description thereof will be omitted here. The % relating to an element of a chemical composition represents mass %.

The present inventors have made an examination and investigation with respect to SSC resistance of low-alloy steel for oil country tubular goods, and have obtained the following findings.

(A) When hexagonal $M_2C$ carbides are formed in the low-alloy steel for oil country tubular goods, the SSC resistance increases. Here, the hexagonal $M_2C$ carbides represent $M_2C$ carbides having a hexagonal crystal structure. "M" of $M_2C$ represents Mo, or Mo and V.

Mo and C promote formation of the hexagonal $M_2C$ carbides that are fine carbides. FIG. 1A shows a transmission electron microscope (TEM) micrograph of the low-alloy steel for oil country tubular goods according to the embodiment of the invention. The hexagonal $M_2C$ carbides are the fine carbides with plate-shaped, and a grain size thereof is approximately 1 nm to 50 nm in an equivalent circle diameter. The hexagonal $M_2C$ carbides are different from $M_2C$ carbides having a cubic crystal structure. The hexagonal M2C carbides have the plate-shaped, and thus tend to trap diffusive hydrogen. It seems that the hexagonal $M_2C$ carbides strongly trap the hydrogen and the trapped hydrogen becomes inactivated, so that occurrence of the SSC is suppressed. Furthermore, the hexagonal $M_2C$ carbides are fine, and thus hardly act as a starting point of SSC. Accordingly, the hexagonal $M_2C$ carbides contribute to an improvement of the SSC resistance. The hexagonal $M_2C$ carbides may be identified by electron microscope observation and electron beam diffraction as described later. In addition, with regard to the presence of the hexagonal $M_2C$ carbides, the presence itself may be also confirmed by X-ray diffraction of an electrolytic extracted residue as described later.

When five pieces or more of the hexagonal $M_2C$ carbides having a grain size (equivalent circle diameter) of 1 nm or more are present in one square micron ($\mu m^2$), the SSC resistance of the low-alloy steel for oil country tubular goods increases. In addition, there is a possibility that the hexagonal $M_2C$ carbides having a grain size of less than 1 nm may be present. However, the identification of the hexagonal $M_2C$ carbides of less than 1 nm by the electron microscope and electron beam diffraction is technically difficult. Therefore, in the invention, the number of the hexagonal $M_2C$ carbides having the grain size of 1 nm or more per unit area is provided.

(B) The Mo content is to be more than 1% and 10% or less. In the case, not only the formation of the above-described hexagonal $M_2C$ carbides is promoted, but also penetration of hydrogen into steel under hydrogen sulfide environment is suppressed. Specifically, Fe sulfide that is a corrosion product is formed on a surface of the steel under the hydrogen sulfide environment. Mo concentrates in the Fe sulfide, and increases a protective performance of the Fe sulfide of the steel surface. Accordingly, the penetration of hydrogen into the steel under the hydrogen sulfide environment is suppressed, and thus the SSC resistance increases.

(C) In the low-alloy steel for oil country tubular goods, various carbides in addition to the hexagonal $M_2C$ carbides are further formed during quenching and tempering. Among the carbides, $M_3C$ carbides and $M_{23}C_6$ carbides that are mainly formed at grain boundaries or lath interfaces of martensite structure are defined as "grain boundary carbides" in the invention. Here, "M" of the $M_3C$ carbides and the $M_{23}C_6$ carbides represents Fe, Cr, or Mo.

The grain boundary carbides are greatly larger than the hexagonal $M_2C$ carbides and have a size of several 100 mn Since the grain boundary carbides are large, when the shape of the grain boundary carbides is flat, the sulfide stress cracking (SSC) tends to occur at the grain boundary carbides as the starting point. On the other hand, when the shape of the grain boundary carbides is to be spherical, the SSC is hard to occur at the grain boundary carbides, and thus the SSC resistance is improved. Accordingly, to improve the SSC resistance, it is preferable to spheroidize the grain boundary carbides.

The grain boundary carbides may be spheroidized to some extent by an increase in a tempering temperature. However, the spheroidizing of the grain boundary carbides by the increase in the tempering temperature has a limit. Therefore, it is preferable to further spheroidize the grain boundary carbides by a method other than the method of the increase in the tempering temperature.

When increasing the amount of C, specifically, when the amount of C is increased to be more than 0 35%, the grain boundary carbides in the steel may be further spheroidized. Accordingly, the SSC resistance further increases. The reason why the grain boundary carbides is spheroidized when increasing the amount of C is assumed to be as follows. When the amount of C increases, the total of the grain boundary carbides increases. Accordingly, the concentration of Cr and Mo in each grain boundary carbides decreases, and thus the grain boundary carbides is spheroidized.

(D) When dislocation density in the steel is high, the SSC resistance decreases. This is because the dislocation acts as a hydrogen trap site. It seems that the dislocation weakly traps the hydrogen by the Cottrel effect and the trapped hydrogen is capable of diffusing once more, so that hydrogen brittleness occurs by diffusing to a crack tip of the sulfide stress cracking (SSC). In other words, when the hexagonal $M_2C$ carbides are contained and the dislocation density is low, the hydrogen in the steel is preferentially and strongly trapped at the hexagonal $M_2C$ carbides. As a result, the SSC resistance is improved. Accordingly, it is preferable that the dislocation density be low.

A full width at half maximum of a crystal plane in X-ray diffraction is affected by the dislocation density. Specifically, the full width at half maximum is broadened with an increase in the dislocation density. Accordingly, in the invention, the full width at half maximum HW (°) of a diffraction peak of (211) crystal plane, which is obtained by X-ray diffraction, is considered as a parameter indicating lattice strain. The lattice strain increases with the increase in the dislocation density. In a case where the amount of C is more than 0.35% and the amount of Mo is more than 1%, when the full width at half maximum HW satisfies an Expression 1, the dislocation density in the steel is sufficiently low, and the excellent SSC resistance may be obtained.

$$HW \times C^{1/2} \geq 0.38 \qquad \text{(Expression 1)}$$

Here, the amount of carbon (mass %) is substituted for C in the Expression 1.

The low-alloy steel for oil country tubular goods according to the embodiment primarily includes, as a metallographic structure, tempered martensite and tempered bainite. However, since the martensite, bainite, and ferrite correspond to crystal structure of BCC (Body Centered Cubic) or structure including it, it is difficult to distinguish the martensite, the bainite, and the ferrite by X-ray diffraction method. In the invention, the martensite, the bainite, and the ferrite are regarded as α phase. Accordingly, the full width at half maximum HW of the diffraction peak of (211) crystal plane represents a full width at half maximum of a crystal plane corresponding to (211) crystal plane of the α phase.

As described above, in a range of chemical composition that is specified in the embodiment, when five pieces or more of the hexagonal $M_2C$ carbides having the grain size of 1 nm or more precipitate in one square micron ($\mu m^2$), and the full width at half maximum HW satisfies the Expression 1, the excellent SSC resistance may be obtained.

The present inventors have accomplished the invention based on the above-described findings. Hereinafter, the low-alloy steel for oil country tubular goods according to the embodiment will be described.

[Chemical Composition]

The low-alloy steel for oil country tubular goods according to the embodiment has the following chemical composition. Hereinafter, "%" of the amount of respective elements as described below expresses "mass %". Moreover, the limitation range of respective elements as described below includes a lower limit and an upper limit thereof. However, the limitation range in which the lower limit is shown as "more than" does not include the lower limit, and the limitation range in which the upper limit is shown as "less than" does not include the upper limit.

The low-alloy steel for oil country tubular goods according to the embodiment includes, as base elements, C, Si, Mn, Al, and Mo.

C: more than 0.35% to 1.00%

In the low-alloy steel for oil country tubular goods according to the embodiment, the amount of carbon (C) is more than that of conventional low-alloy steel for oil country tubular goods. When a large amount of C is contained, the spheroidizing of the grain boundary carbides is promoted, and thus the SSC resistance of the steel is improved. On the other hand, when C is excessively contained, the effect is saturated. Accordingly, the amount of C is to be more than 0.35% and 1.00% or less. The lower limit of the amount of C is preferably 0.45%, more preferably 0.51%, and still more preferably 0.56%. The upper limit of the amount of C is less than 1.00%, more preferably 0.80%, and still more preferably 0.70%.

Si: 0.05% to 0.5%

Silicon (Si) deoxidizes the steel. On the other hand, when Si is excessively contained, the effect is saturated. Accordingly, the amount of Si is to be 0.05% to 0.5%. The lower limit of the amount of Si is preferably more than 0.05%, more preferably 0.1%, and still more preferably 0.13%. The upper limit of the amount of Si is preferably less than 0.5%, more preferably 0.40%, and still more preferably 0.30%.

Mn: 0.05% to 1.0%

Manganese (Mn) increases hardenability of the steel. On the other hand, when Mn is excessively contained, manganese segregates at the grain boundaries together with impurity elements such as phosphorous (P), sulfur (S), and the like. As a result, the SSC resistance of the steel decreases. Accordingly, the amount of Mn is to be 0.05% to 1.0%. The lower limit of the amount of Mn is preferably more than 0.05%, more preferably 0.10%, and still more preferably 0.35%. The upper limit of the amount of Mn is preferably less than 1 0%, more preferably 0.70%, more preferably 0.65%, and still more preferably 0.50%.

Al: 0.005% to 0.10%

Aluminum (Al) deoxidizes the steel. On the other hand, when Al is excessively contained, the effect is saturated, and inclusions increase. Accordingly, the amount of Al is to be 0.005% to 0.10%. The lower limit of the amount of Al is preferably more than 0.005%, more preferably 0.010%, and still more preferably 0.020%. The upper limit of the amount of Al is preferably less than 0.10%, more preferably 0.06%, and still more preferably 0.05%. In the embodiment, the amount of "Al" represents "acid-soluble Al", that is, the amount of "sol. Al".

Mo: more than 1.0% to 10%

Molybdenum (Mo) increases the hardenability, and increases a fraction of martensite in a structure. Accordingly, Mo increases the strength of the steel. Furthermore, Mo concentrates in the Fe sulfide (corrosion product) that is formed on the surface of the steel under the hydrogen sulfide environment, and increases the protective performance of the Fe sulfide of the steel surface. Accordingly, the penetration of hydrogen into the steel is suppressed, and thus the SSC resistance of the steel increases. Furthermore, Mo forms the hexagonal $Mo_2C$ carbides that are the fine carbides. The hexagonal $Mo_2C$ carbides strongly fix (trap) the diffusive hydrogen, and thus the occurrence of the SSC due to hydrogen is suppressed. On the other hand, when Mo is excessively contained, the effect is saturated. Accordingly, the amount of Mo is to be more than 1.0% and 10% or less. The lower limit of the amount of Mo is preferably 1.20%, more preferably 1.30%, and still more preferably 1.55%. The upper limit of the amount of Mo is preferably less than 10%, more preferably 4.0%, and still more preferably 3.0%.

The low-alloy steel for oil country tubular goods according to the embodiment includes impurities. Herein, "impurities" represent elements which are contaminated during industrial production of the steel from ores and scarp that are used as a raw material of the steel, or from environment of a production process. Among the impurities, it is preferable that P, S, O, and N are limited to the following in order to sufficiently obtain the above mentioned effects. Moreover, since it is preferable that the amount of respective impurities is low, a lower limit does not need to be limited, and the lower limit of the respective impurities may be 0%.

P: 0.025% or less

Phosphorous (P) is an impurity. P segregates at the grain boundaries, and decreases the SSC resistance of the steel. Therefore, it is preferable that the amount of P be small. Accordingly, the amount of P is to be 0.025% or less. The amount of P is preferably less than 0.025%, more preferably 0.020% or less, and still more preferably 0.015% or less.

S: 0.010% or less

Sulfur (S) is an impurity in common with P. S segregates at the grain boundaries, and decreases the SSC resistance of the steel. Therefore, it is preferable that the amount of S be small. Accordingly, the amount of S is to be 0.010% or less. The amount of S is preferably less than 0.010%, more preferably 0.005% or less, and still more preferably 0.003% or less.

O: 0.01% or less

Oxygen (O) is an impurity. When O is excessively contained, coarse oxides are formed, and thus toughness and the SSC resistance of the steel decrease. Therefore, it is preferable that the amount of O be small. Accordingly, the amount of O is to be 0.01% or less, and more preferably 0.005% or less.

N: 0.03% or less

Nitrogen (N) is an impurity. When N is excessively contained, coarse nitrides are formed. The coarse nitrides act as the starting point of the pitting corrosion, and thus the SSC resistance may decrease. Accordingly, the amount of N is to be 0.03% or less. The upper limit of the amount of N is preferably less than 0.03%, more preferably 0.025%, and still more preferably 0.02%. On the other hand, a small amount of Nitrogen (N) bonds to Nb, Ti, and Zr to form nitrides or carbonitrides, which results in refinement of the structure of the steel by a pinning effect. Thus, the small amount of N may be consciously included in the steel. A lower limit of N to obtain the effect is preferably 0.003%, and more preferably 0.004%.

In addition, N is an impurity for production of the steel. In a case where the above-described effects of the nitrides or carbonitrides are not positively required, N may be less than 0.003% as the impurity.

The chemical composition of the low-alloy steel for oil country tubular goods according to the embodiment includes the above mentioned base elements and optional elements as described below, and the balance consists of Fe and the above mentioned impurities. As described above, the mentioned impurities represent the elements which are contaminated from the ores and the scarp that are used as the raw material of the steel, or from the environment of the production process.

[Optional Elements]

The chemical composition of the low-alloy steel for oil country tubular goods according to the embodiment may further include at least one optional element of Cr, V, Nb, Ti, Zr, Ca, and B in substitution for a part of Fe. The optional elements may be included as necessary. Thus, a lower limit of the respective optional elements does not need to be limited, and the lower limit may be 0%. Moreover, even if the optional elements may be included as impurities, the above mentioned effects are not affected.

The low-alloy steel for oil country tubular goods may further include Cr in substitution for a part of Fe.

Cr: 0% to 2%

Chromium (Cr) is an optional element. Cr increases the hardenability of the steel. Even when a little amount of Cr is contained, the effect may be obtained. On the other hand, when Cr is excessively contained, the effect is saturated. Accordingly, as necessary, the amount of Cr is to be 0% to 2%. The lower limit of the amount of Cr is preferably 0.1%, more preferably 0.2%, and still more preferably 0.5%. The upper limit of the amount of Cr is preferably less than 2%, more preferably 1.5%, more preferably 1.0%, more preferably less than 0.8%, and still more preferably 0.7%.

The low-alloy steel for oil country tubular goods may further include V in substitution for a part of Fe.

V: 0% to 0.30%

Vanadium (V) forms the hexagonal $M_2C$ carbides, which are the fine carbides, in combination with Mo, and thus the SSC resistance increases. Here, "M" of the hexagonal $M_2C$ carbides represents Mo and V. Furthermore, V forms MC carbides having a cubic crystal structure (M represents Mo and V), and thus increases the tempering temperature of the steel for obtaining high yield strength. The cubic MC carbides are fine in contrast to the grain boundary carbides, and thus hardly act as a starting point of SSC. Even when a little amount of V is contained, the above-described effect may be obtained. On the other hand, V is excessively contained, the amount of solid-soluted V at the quenching is saturated, and thus the effect of the increase in the tempering temperature is also saturated. Accordingly, as necessary, the amount of V is to be 0% to 0.30%. The lower limit of V is preferably 0.05%, more preferably 0.07%, and still more preferably 0.1%. The upper limit of the amount of V is preferably less than 0.30%, more preferably 0.25%, and still more preferably 0.20%.

The low-alloy steel for oil country tubular goods may further include at least one selected from a group consisting of Nb, Ti, and Zr in substitution for a part of Fe.

Nb: 0% to 0.1%
Ti: 0% to 0.1%
Zr: 0% to 0.1%

Niobium (Nb), titanium (Ti), and zirconium (Zr) are optional elements. The elements bond to C or N to form carbides, nitrides, or carbonitrides. The precipitates (the carbides, the nitrides, and the carbonitrides) refine the structure of the steel by the pinning effect. Even when at least one selected from the group consisting of Nb, Ti, and Zr is contained in a little amount, the above-described effect may be obtained. On the other hand, when Nb, Ti, and Zr are excessively contained, the effect is saturated. Accordingly, as necessary, the amount of Nb is to be 0% to 0.1%, the amount of Ti is to be 0% to 0.1%, and the amount of Zr is to be 0% to 0.1%. When the amount of Nb is 0.002% or more, the amount of Ti is 0.002% or more, or the amount of Zr is 0.002% or more, the above-described effect may be significantly obtained. The lower limits of the amount of Nb, the amount of Ti, and the amount of Zr are more preferably 0.005%. The upper limits of the amount of Nb, the amount of Ti, and the amount of Zr are preferably 0.05%.

The low-alloy steel for oil country tubular goods may further include Ca in substitution for a part of Fe.

Ca: 0% to 0.01%

Calcium (Ca) is an optional element. Ca bonds to S in the steel to form sulfides, and improves a shape of inclusions, thereby the SSC resistance increases. Even when a little amount of Ca is contained, the above-described effect may be obtained. On the other hand, when Ca is excessively contained, the effect is saturated. Accordingly, as necessary, the amount of Ca is to be 0% to 0.01%. The lower limit of the amount of Ca is preferably 0.0003%, and more preferably 0.0005%. The upper limit of the amount of Ca is preferably 0.0030%, and more preferably 0.002%.

The low-alloy steel for oil country tubular goods may further include B in substitution for a part of Fe.

B: 0% to 0.003%

Boron (B) is an optional element. B increases the hardenability of the steel. Even when a little amount of B is contained, the above-described effect may be obtained. On the other hand, when B is excessively contained, the effect is saturated. Accordingly, as necessary, the amount of B is to be 0% to 0.003%. The lower limit of the amount of B is preferably 0.0003%, and more preferably 0.0005%. The upper limit of the amount of B is preferably 0.0015%, and more preferably 0.0012%.

The metallographic structure of the low-alloy steel for oil country tubular goods according to the embodiment primarily includes the tempered martensite and the tempered bainite, and moreover includes the precipitates such as the $M_2C$ carbides having the hexagonal crystal structure.

[Hexagonal $M_2C$ Carbides]

The low-alloy steel for oil country tubular goods contains five pieces or more of the hexagonal $M_2C$ carbides per one square micron (that is, 5 pieces/$\mu m^2$ or more). Here, the hexagonal $M_2C$ carbides are the carbides having the hexagonal crystal structure, and are different from the $M_2C$ carbides having the cubic crystal structure. "M" of the hexagonal $M_2C$ carbides is Mo, or Mo and V.

Figure 1B:
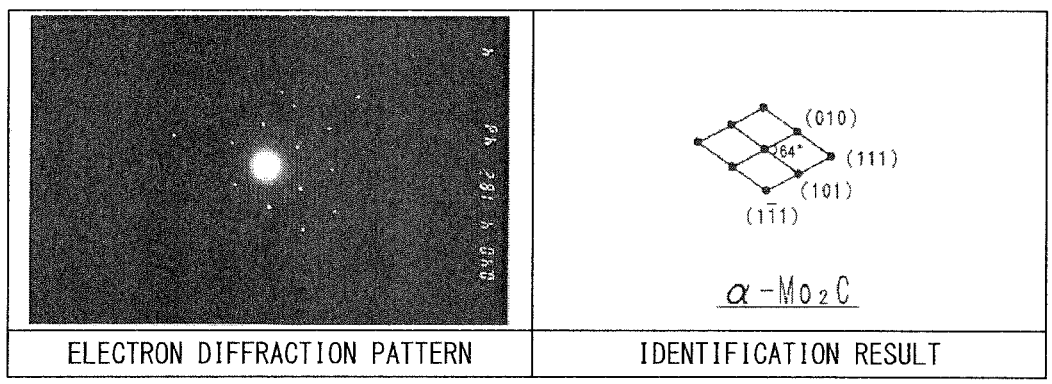
FIG. 1B is an electron diffraction pattern and a view illustrating an identification result of the hexagonal $M_2C$ carbides which are contained in the low-alloy steel for oil country tubular goods according to the embodiment.

The number of the hexagonal $M_2C$ carbides is measured by the following method. Samples for TEM (transmission electron microscope) are collected from an arbitrary part of the low-alloy steel for oil country tubular goods, for example, from a part including a thickness central portion of the steel plate or the steel pipe. As a method collecting the sample, methods such as a thin film method and an extraction replica method are used. 10 visual fields in the collected sample are observed by the TEM to obtain TEM micrographs of the respective visual fields. An area of each of the visual fields is to be 1 $\mu m^2$. An electron beam diffraction pattern of the carbides in each visual field is confirmed to identify a type of the carbides. FIG. 1B shows a typical pattern of the diffraction pattern of the hexagonal $M_2C$ carbides by electron microscope observation. In addition, the hexagonal $M_2C$ carbides may also be clearly distinguished from other carbides including the cubic $M_2C$ carbides by X-ray diffraction. Accordingly, the confirmation about whether the hexagonal $M_2C$ carbides precipitates or not may also be possible by carrying out X-ray diffraction of the extracted residue after electrolytically extracting the carbides in a steel material. FIG. 2 shows a diffraction pattern of the X-ray diffraction. In FIG. 2, the horizontal axis represents $2\theta$ (°) of X-rays (providing that, $\theta$ is an incidence angle), and the vertical axis represents diffraction intensity. "$Mo_2C$" and "MC" in FIG. 2 represent the type of the carbides. The "$Mo_2C$" represents the hexagonal $M_2C$ carbides. The "MC" represents the cubic MC carbides (M represents Mo and V) or the cubic $M_2C$ carbides. In FIG. 2, "(021)", "(112)", and the like represent crystal planes (miller indices). As shown in FIG. 2, the hexagonal $M_2C$ carbides may be clearly distinguished from other carbides including the cubic MC carbides or the cubic $M_2C$ carbides by the X-ray diffraction.

The number of the hexagonal $M_2C$ carbides, which are identified at each visual field of the electron microscope observation and have the grain size of 1 nm or more, is counted to calculate an average number per 1 $\mu m^2$. The calculated average number is defined as the number of the hexagonal $M_2C$ carbides per 1 $\mu m^2$ (pieces/$\mu m^2$). When the number of the hexagonal $M_2C$ carbides is 5 pieces/$\mu m^2$ or more, the excellent SSC resistance may be obtained.

The grain size of the hexagonal $M_2C$ carbides is approximately 1 nm to 50 nm. Here, the grain size of the hexagonal $M_2C$ carbides is measured by the following method. An area of each of the hexagonal $M_2C$ carbides is obtained by image analysis. The equivalent circle diameter of the obtained area is defined as the grain size of the hexagonal $M_2C$ carbides.

As described above, in the embodiment, the number of the hexagonal M$_2$C carbides having the grain size of 1 nm or more is counted.

Upper limits of the number and the grain size of the hexagonal M$_2$C carbides are not particularly limited. However, the hexagonal M$_2$C carbides having the grain size of more than 50 nm is hardly observed, the upper limits of the grain size of the hexagonal M$_2$C carbides may be 50 nm.

Moreover, as described above, in the low-alloy steel for oil country tubular goods according to the embodiment, it is preferable that the shape of the grain boundary carbides is spherical. Specifically, among carbides, average of aspect ratio of the grain boundary carbides such as the M$_3$C carbides and the M$_{23}$C$_6$ carbides which are mainly formed at the grain boundaries or the lath interfaces of martensite structure is preferably 3 or less, and more preferably 2 or less. Herein, a value, which divides the major axis by the minor axis of the grain boundary carbides on an observed section, is defined as the aspect ratio. The aspect ratio is measured by the following method. Samples are collected from an arbitrary part of the low-alloy steel for oil country tubular goods, for example, from a part including the thickness central portion of the steel plate or the steel pipe. 10 visual fields in the collected sample are observed by optical microscope, scanning electron microscope, or the transmission electron microscope. The aspect ratio of the grain boundary carbides in each visual field is measured, and the average thereof is calculated.

Moreover, as described above, in the low-alloy steel for oil country tubular goods according to the embodiment, it is preferable that the dislocation density is low while the hexagonal M$_2$C carbides are contained.

[Full Width at Half Maximum HW]

In the low-alloy steel for oil country tubular goods according to the embodiment, the full width at half maximum HW (°) of the diffraction peak of the crystal plane corresponding to (211) crystal plane of the α phase, which is obtained by the X-ray diffraction method, satisfies the Expression 1.

$$HW \times C^{1/2} \leq 0.38 \quad \text{(Expression 1)}$$

Here, the amount of C (mass %) is substituted for the element symbol C.

The full width at half maximum HW is measured by the X-ray diffraction method as follow. Specifically, Samples are collected from an arbitrary part of the low-alloy steel for oil country tubular goods, for example, from a part including the thickness central portion of the steel plate or the steel pipe. A surface of the collected sample is chemically polished. X-ray diffraction is carried out to the chemically polished surface by using CoKα-ray (Kα1) as an incident X-ray. The full width at half maximum of the crystal plane corresponding to (211) crystal plane of the α phase is measured in unit of °.

Specifically, Kα1 and Kα2 in the CoKα-ray are separated by fitting to extract only the Kα1, and the full width at half maximum (°) diffracted by the Kα1-ray of (211) crystal plane of the sample is measured. Moreover, the full width at half maximum is measured at a height which is a half height of the peak height (peak top method). In addition, with regard to a full width at half maximum derived from a device, the full width at half maximum derived from the device is measured by using a single crystal (ideal single crystal which does not have a full width at half maximum) of LaB$_6$ (lanthanum hexaboride), and correction may be carried out by subtracting the full width at half maximum derived from the device from the actually measured value.

The dislocation acts as the weak trap site of the hydrogen, the trapped hydrogen is capable of diffusing once more, so that the SSC resistance decreases. Accordingly, it is preferable that the dislocation density be low. When the full width at half maximum satisfies the Expression 1, it is considered that the dislocation density is suppressed, and thus the diffusible hydrogen is hard to be accumulated in the steel. Accordingly, the excellent SSC resistance may be obtained. On the other hand, when the full width at half maximum does not satisfy the Expression 1, it is considered that the suppression of the dislocation density is insufficient, and thus the SSC resistance is insufficient.

A lower limit of HW×C$^{1/2}$ is not particularly limited. In order to preferably improve the SSC resistance, lower values of HW×C$^{1/2}$ are preferred.

Moreover, in the low-alloy steel for oil country tubular goods according to the embodiment, it is preferable that the carbon content and the molybdenum content expressed in mass % in the chemical composition satisfy a predetermined relationship in order to preferably obtain the effect of the aspect of the present invention.

[Relationship between Amount of C and Amount of Mo]

Preferably, the chemical composition of the low-alloy steel for oil country tubular goods further satisfies an Expression 2.

$$C \times Mo \geq 0.6 \quad \text{(Expression 2)}$$

Here, in the Expression 2, the amount of C (mass %) is substituted for the element symbol C, and the amount of Mo (mass %) is substituted for the element symbol Mo.

When the amount of C and the amount of Mo satisfy the Expression 2 and production is carried out under production conditions as described later, the hexagonal M$_2$C carbides are formed, and the member thereof is to be 5 pieces/μm$^2$ or more. Accordingly, the excellent SSC resistance may be obtained. More specifically, the sufficient SSC resistance may be obtained for the 125 ksi grade or higher, and the high K$_{ISSC}$ value may be obtained for the 110 ksi grade or higher.

In order to further improve the SSC resistance, the relationship between the C content and the Mo content is preferably C×Mo≥0.65, and more preferably C×Mo≥0.7.

[Structure]

As mentioned above, the structure of the low-alloy steel for oil country tubular goods according to the embodiment includes a mixed structure of the tempered martensite and the tempered bainite. More specifically, the structure of the low-alloy steel for oil country tubular goods mainly includes the tempered martensite and the tempered bainite, and may include the precipitates such as carbides, nitrides, carbonitrides, and the like, inclusions, or residual austenite. However, a fraction of the residual austenite (a volume fraction of the residual austenite to the entire structure, in unit of %) may be 5% or less. This is because the residual austenite causes unevenness of strength.

The fraction of the residual austenite is measured by the X-ray diffraction method as follows. Specifically, Samples, which include the thickness central portion of the produced steel plate or the produced steel pipe, are collected. A surface of the collected sample is chemically polished. X-ray diffraction is carried out to the chemically polished surface by using CoKα-ray (Kα1) as an incident X-ray. The fraction of the residual austenite is quantitatively analyzed from the integrated diffraction intensity of the crystal plane corresponding to (211) crystal plane, (200) crystal plane, and (110) crystal plane of the α phase and the integrated diffraction intensity of (220) crystal plane, (200) crystal plane, and (111) crystal plane of austenite.

In addition, when the amount of C is high as the low-alloy steel for oil country tubular goods according to the embodiment, the quenching crack due to martensite transformation tends to occur. As a method of suppressing the quenching crack, there is a method in which water cooling during quenching is temporarily stopped in order for the structure of the steel for oil country tubular goods to have a structure mainly composed of bainite However, in a case where the structure is mainly composed of the bainite, a considerable amount of carbides are formed during the quenching. The carbides retard the recovery of the dislocation during the tempering. Therefore, in the case of the structure mainly composed of the bainite, the dislocation density increases, and thus the Expression 1 is not satisfied.

When a fraction of the martensite in the structure after the quenching is high, the dislocation density decreases by the tempering. At present, it is difficult to quantitatively measure the volume fraction of the martensite and the volume fraction of the bainite in the steel after the quenching. However, the hardness of the steel after the quenching (that is, a quenched material) increases with an increase in the fraction of the martensite in the steel. Accordingly, when Rockwell harness (HRC) in C scale at the thickness central portion (thickness central portion of the steel plate or the steel pipe) of the low-alloy steel for oil country tubular goods after the quenching and before the tempering (that is, the quenched material) preferably satisfies a following Expression 3, a sufficient fraction of the martensite is formed in the steel for decreasing the dislocation density by the tempering.

$$\text{Rockwell hardness }(HRC) \geq 50 \times C + 26 \quad \text{(Expression 3)}$$

For example, in the steel in which the amount of C is 0.6%, when the Rockwell hardness (BRC) is 56 or more, the dislocation is sufficiently recovered after the tempering (that is, Expression 1 is satisfied), and the SSC resistance increases.

In the low-alloy steel for oil country tubular goods according to the embodiment, by simultaneously satisfying the above mentioned chemical composition and the above mentioned metallographic structure, it is possible to obtain the prominent effect such that the yield strength and the SSC resistance are simultaneously excellent. Specifically, the low-alloy steel for oil country tubular goods according to the embodiment, which simultaneously satisfies the above mentioned chemical composition and the above mentioned metallographic structure, has the yield strength of 758 MPa or more, and is excellent in the SSC resistance containing the SSC resistance in the environment of high pressure hydrogen sulfide, the SSC resistance in the case where the notch is applied, and the like.

Next, a method of producing the low-alloy steel for oil country tubular goods according to an embodiment of the invention will be described. The producing method according to the embodiment is for the above mentioned low-alloy steel for oil country tubular goods.

[Production Method]

In the method of producing the low-alloy steel for oil country tubular goods according to the embodiment, typically, a method of producing seamless steel pipes (low-alloy oil country tubular goods) will be described.

The method of producing the low-alloy steel for oil country tubular goods according to the embodiment includes a steel making process, a casting process, a blooming process, a hot-working process, a quenching process, and a tempering process.

As the steel making process, the steel having the above-described chemical composition is melted, and is refined by a conventional method. Subsequently, as the casting process, the molten steel is formed into a continuous casting material (cast piece) by a continuous casting method. The continuous casting material is, for example, a slab or a bloom. Otherwise, the molten steel may be formed into a round billet by the continuous casting method. In addition, the molten steel may be formed into an ingot by an ingot-making method.

As necessary, as the blooming process, the slab, bloom, or ingot is hot-bloomed to form a billet (billet for manufacturing a seamless steel pipe). The billet may be formed by hot rolling or hot forging.

As the hot-working process, the billet obtained by the continuous casting or the hot-blooming is hot-worked to produce a steel material. In the embodiment, a shape of the steel material is a material pipe. For example, in the hot-working process, a Mannesmann process is carried out as the hot working to produce the material pipe. The material pipe may be produced by other hot working methods.

Figure 3:
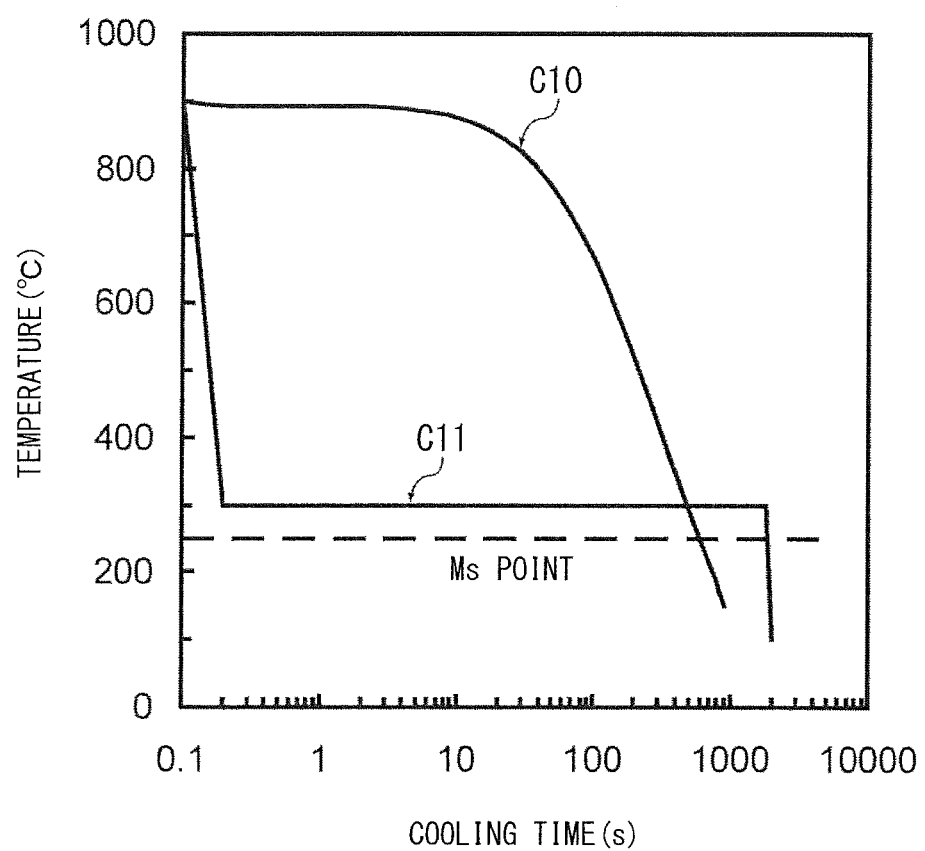
FIG. 3 is a view explaining a quenching process in a method of producing a low-alloy steel for oil country tubular goods according to an embodiment of the present invention and a view illustrating a quenching process including a continuous cooling treatment and a quenching process including an isothermal treatment.

As the quenching process, the quenching is carried out for the hot-worked steel material (material pipe). As the quenching in the quenching process, for example, either quenching C10 by a continuous cooling treatment or quenching C11 including an isothermal treatment as shown in FIG. 3 may be adapted. In the invention, both the quenching C10 by the continuous cooling treatment and the quenching C11 including the isothermal treatment are defined as "quenching". In the steel according to the embodiment in which C content is high, when the thickness of the pipe is approximately 10 mm or more and a general quenching method is applied, the quenching crack tends to occur at the quenching. Thus, the quenching method as shown in FIG. 3 is adopted. Moreover, "Ms point" in FIG. 3 represents a martensite transformation start temperature.

Even in any quenching (the quenching by the continuous cooling treatment, or the quenching including the isothermal treatment), it is preferable that a quenching start temperature of the steel material (a surface temperature of the steel material at the start of the quenching) is 850° C. to 920° C.

Moreover, the martensite transformation start temperature (Ms point) varies depending on the chemical composition of the steel. The Ms point of each chemical composition can be estimated without a large margin of error by a typical estimated formula such as a following Expression 4 for example. With respect to the following estimated formula, zero may be substituted for elements which are not included in the chemical composition.

$$Ms(°\ C.) = 521 - 353 \times C - 22 \times Si - 24.3 \times Mn - 7.7 \times Cu - 17.3 \times Ni - 17.7 \times Cr - 25.8 \times Mo \quad \text{(Expression 4)}$$

Hereinafter, the quenching by the continuous cooling treatment and the quenching including the isothermal treatment will be described in detail.

[Quenching by Continuous Cooling Treatment in Quenching Process]

In the case of the quenching by the continuous cooling treatment, as shown in a curve C10 of FIG. 3, the steel material is continuously cooled from the quenching start temperature, and the surface temperature of the steel material continuously is decreased. As the continuous cooling treatment, for example, a method of cooling the steel material by immersing it in a water bath or an oil bath, or a method of cooling the steel material by shower water cooling, mist cooling, or air cooling can be applied.

In the continuous cooling treatment, a time (passing time at the Ms point), for which the surface temperature of the steel material reaches a martensite transformation start temperature (Ms point) from the quenching start temperature, is preferably 100 seconds to 600 seconds. When the passing time at the Ms point is more than 600 seconds, it is difficult to obtain the hardness satisfying the Expression 3, and thus the fraction of the martensite in the steel structure after the quenching decreases. Therefore, the Expression 1 is not satisfied, and thus the excellent SSC resistance may not be obtained.

Moreover, when the passing time at the Ms point is more than 600 seconds, the grain boundary carbides are formed during the cooling. In a case where the grain boundary carbides are formed, the carbides act as nuclei and grow during the tempering, and C, Mo, and the like in the steel are consumed. Thus, it is difficult to preferably form the hexagonal $M_2C$ carbides. As a result, the excellent SSC resistance may not be obtained.

On the other hand, when the passing time at the Ms point is less than 100 seconds, the quenching crack tends to occur during the quenching. Thus, it is preferable that the passing time at the Ms point is 100 seconds or more.

In a case where the steel material is the material pipe (steel pipe) and the quenching by the continuous cooling treatment is carried out, a cooling rate in a range where a temperature of an outer surface of the steel pipe reaches 500° C. from 800° C. is defined as $CR_{8-5}$ (° C./s). In a case where the amount of C of the material pipe is approximately 0.6%, the cooling rate $CR_{8-5}$ preferably satisfies a following Expression 5.

$$CR_{8-5} \leq 2837 \times t^{-2.2} \quad \text{(Expression 5)}$$

Here, t represents the thickness (in unit of mm) of the steel pipe.

When the cooling rate $CR_{8-5}$ satisfies the Expression 5, occurrence of the quenching crack is preferably suppressed in the steel pipe to which the quenching by the continuous cooling treatment has been carried out. During the quenching, there is a time difference in occurrence of the martensite transformation between an outer surface side and an inner surface side of the steel pipe. Therefore, it is considered that residual stress which causes the quenching crack generates in the steel pipe. The residual stress derived from the quenching may be obtained by stress-strain distribution analysis of a finite element method (FEM: Finite Element Method). By comparison between the residual stress value obtained from the FEM analysis result and quenching crack behavior of the actual steel pipe, when a tensile residual stress is 200 MPa or less, it could be confirmed that the quenching crack of the steel pipe of the embodiment is suppressed.

With an increase in the thickness t (mm) of the steel pipe, the time difference in the occurrence of the martensite transformation between the inner surface and outer surface of the steel pipe increases, and thus the tensile residual stress increases. With a decrease in the cooling rate, the time difference in the above-described martensite transformation decreases. Accordingly, the tensile residual stress decreases, and thus the occurrence of the quenching crack is also suppressed.

Figure 4:
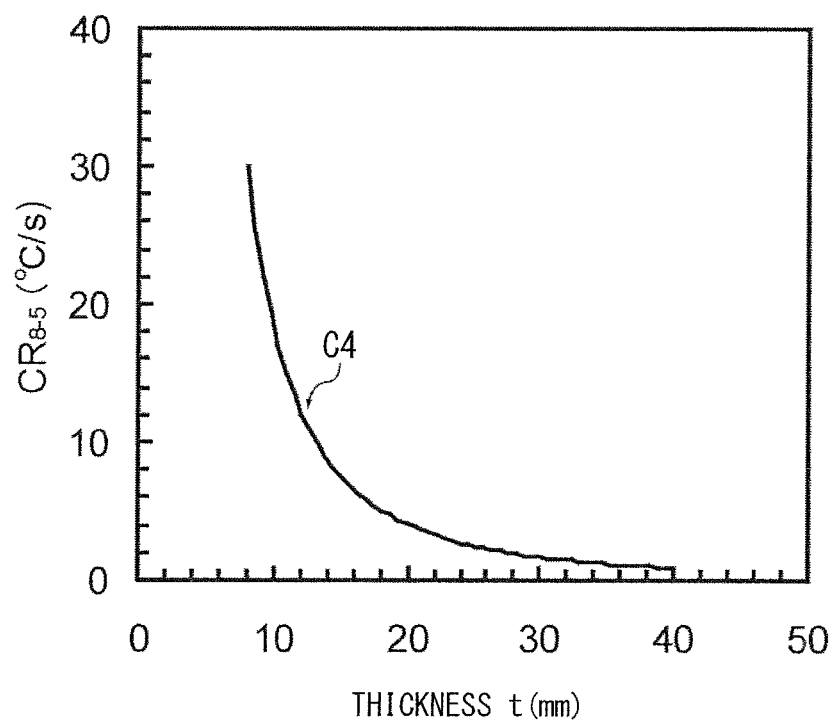
FIG. 4 is a view illustrating a relationship between a thickness t (mm) of a steel pipe and a cooling rate $CR_{8-5}$ (° C./s) in order to suppress quenching crack during the quenching in the continuous cooling treatment.

FIG. 4 is a view illustrating a relationship between the thickness t (mm) of the steel pipe and the cooling rate $CR_{8-5}$ (° C./s) in order to suppress the quenching crack during the quenching in the continuous cooling treatment. A curve C4 in FIG. 4 represents the right-hand side(=$2837 \times t^{-2.2}$) of the Expression 5. The curve C4 represents a relationship between the cooling rate $CR_{8-5}$ (° C./s) and the thickness t (mm) of the steel pipe with which the tensile residual stress becomes 200 MPa.

Referring to FIG. 4, the quenching crack is suppressed at a lower side of the curve C4. On the other hand, the quenching crack tends to occur at an upper side of the curve C4. Accordingly, the steel pipe is preferably cooled during the cooling so that the cooling rate $CR_{8-5}$ satisfies the Expression 5. In the case, particularly, it is possible to produce the seamless steel pipe, which does not have the quenching crack defect or in which occurrence of the quenching crack is suppressed, in the seamless steel pipe having an outer diameter of 100 to 400 mm and a thickness of 5 to 100 mm. In addition, the right-hand side value(-$2837 \times t^{-2.2}$) of the Expression 5 corresponds to a case in which the amount of C in the steel is approximately 0.6%. With an increase in the amount of C increases, the upper limit of the cooling rate for suppressing the quenching crack shifts to a cooling rate which is smaller than that calculated by the right-hand side of the Expression 5. With a decrease in the amount of C increases, the upper limit of the cooling rate for suppressing the quenching crack shifts to a cooling rate which is larger than that calculated by the right-hand side of the Expression 5.

Specifically, in the case where the quenching by the continuous cooling treatment is conducted in the quenching process, it is possible to improve the SSC resistance of the low-alloy steel for oil country tubular goods by controlling the passing time at the Ms point, and it is possible to preferably suppress the quenching crack during the production by estimating the preferable production conditions with the relation of $CR_{8-5} \leq 2837 \times t^{-2.2}$.

[Quenching including Isothermal Treatment in Quenching Process]

The quenching (curve C11) with the isothermal treatment in FIG. 3 includes a first cooling treatment (an initial cooling), an isothermal treatment, and a second cooling treatment (a final cooling).

In the initial cooling, the steel material (material pipe) after the hot working is cooled from the quenching start temperature to a temperature range of higher than Ms point to 300° C., and the cooling is stopped at the temperature range of higher than Ms point to 300° C. When the cooling stop temperature is higher than 300° C., a fraction of the bainite in the steel structure excessively increases, and thus a large amount of carbides are formed. Therefore, the dislocation is hard to be recovered during the tempering treatment, and the dislocation density is hard to decrease. As a result, the hardness of the steel after the cooling does not satisfy the Expression 3, and thus the Expression 1 is not satisfied. Therefore, the excellent SSC resistance may not be obtained.

Moreover, when the cooling stop temperature is higher than 300° C., the grain boundary carbides are formed. In a case where the grain boundary carbides are formed, the carbides act as nuclei and grow during the tempering, and C, Mo, and the like in the steel are consumed. Thus, it is difficult to preferably form the hexagonal $M_2C$ carbides. As a result, the excellent SSC resistance may not be obtained.

On the other hand, when the cooling stop temperature is Ms point or lower, the quenching crack tends to occur when the cooling rate is rapid. Moreover, when the cooling stop temperature is Ms point or lower, the quenching substantially corresponds to the continuous cooling treatment.

In the isothermal treatment, the steel material after the initial cooling is held for a predetermined time in the temperature range of higher than Ms point to 300° C. It is sufficient that the steel material is held within the above-described temperature range in the isothermal treatment, and it is not limited for the steel material to be held at a constant temperature. A preferable holding time at the isothermal treatment is 5 minutes to 60 minutes.

In the final cooling, the steel material after the isothermal treatment is cooled. The final cooling may be water cooling or air cooling. In other words, the cooling rate during the final cooling is not particularly limited.

In the quenching process including the isothermal treatment, the temperature (higher than Ms point to 300° C.) of the isothermal treatment is lower than a temperature range where bainite transformation tends to occur. Therefore, the quenching process including the isothermal treatment is different from austempering disclosed in Japanese Unexamined Patent Application, First Publication No. 2006-265657.

From the viewpoint of controlling the quenching crack, the isothermal treatment is carried out at a temperature of higher than Ms point and 300° C. or lower. In the case, the cooling rate of the initial cooling may be controlled to be sufficiently large. Although a detailed mechanism is not clear, in the case, it is assumed that a slight amount of the bainite that precipitates during the isothermal treatment suppresses the occurrence of the quenching crack during the final cooling.

In a case where the quenching with the isothermal treatment is conducted, it is preferable that the cooling rate in the initial cooling is 0.7° C./s or more. When the cooling rate is less that 0.7° C./s, the ferrite and perlite or a large amount of the bainite may be formed. Moreover, as long as the isothermal treatment is appropriate in the case where the quenching with the isothermal treatment is conducted, an upper limit of the cooling rate in the initial cooling is not particularly limited.

In addition, in the quenching process including the quenching by the continuous cooling treatment and the quenching with the isothermal treatment, when the Rockwell hardness in C scale at the thickness central portion of the steel material after the quenching process and before the tempering process is the HRC, it is preferable that the steel material is quenched under the condition where the Rockwell hardness HRC satisfies the following Expression 3. When the Rockwell hardness HRC satisfies the following Expression 3, a sufficient fraction of the martensite is formed in the steel for decreasing the dislocation density by the tempering.

$$HRC \geq 50 \times C + 26 \qquad \text{(Expression 3)}$$

[Tempering Process]

After carrying out the quenching by the continuous cooling treatment or the quenching including the isothermal treatment, the tempering is carried out for the steel material. A tempering temperature is appropriately controlled according to the chemical composition of the steel material, and the intended yield strength. In other words, the yield strength may be controlled to 758 MPa or more, and more preferably to 862 MPa or more by adjusting the tempering temperature.

The tempering temperature is preferably 680° C. to $A_{C1}$ point. The lower limit of the tempering temperature is more preferably 690° C., more preferably higher than 700° C., and still more preferably 710° C. As long as the tempering temperature is $A_{C1}$ point or less, the hexagonal $M_2C$ carbides are preferably formed with an increase in the tempering temperature. A preferable tempering time is 10 minutes to 90 minutes in soaking.

In addition, the $A_{C1}$ point is a temperature at which the austenite transformation starts during heating. The $A_{C1}$ point of each chemical composition can be estimated without a large margin of error by a typical estimated formula such as a following Expression 6 for example. With respect to the following estimated formula, zero may be substituted for elements which are not included in the chemical composition.

$$A_{C1}(° C.)=750.8-26.6 \times C+17.6 \times Si-11.6 \times Mn-22.9 \times Cu-23 \times Ni-24.1 \times Cr+22.5 \times Mo-39.7 \times V-5.7 \times Ti+232.4 \times Nb-169.4 \times Al-894.7 \times B \qquad \text{(Expression 6)}$$

In a case where the chemical composition of the steel material satisfies the above mentioned Expression 2 and the tempering is carried out at the above-described preferable tempering temperature, 5 pieces/μm² or more of the hexagonal $M_2C$ carbides having the grain size of 1 nm or more precipitate in the steel, and thus the SSC resistance increases.

From the above-described processes, the low-alloy steel for oil country tubular goods (seamless steel pipes) which is simultaneously excellent in the yield strength and the SSC resistance are produced. Especially, by comprehensively controlling the quenching process and the tempering process, it is possible to simultaneously control the formation of the hexagonal $M_2C$ carbides and the control of the dislocation density.

In the above-described production method according to the embodiment, the quenching process is carried out after the hot-working process. However, a normalizing process of normalizing the steel material may be carried out between the hot-working process and the quenching process. Specifically, the steel material (material pipe) after the hot-working process is held for a predetermined time at a high temperature of $Ac_3$ point or higher, and thereafter, the steel material is cooling. The holding temperature is preferably 900° C. to 920° C. A holding time is, for example, 5 minutes to 60 minutes. Moreover, the $Ac_3$ point is a temperature at which the austenite transformation finishes during heating.

Commonly, in the normalizing process, the steel material after the hot-working process is cooled to a room temperature, and thereafter, the steel material is heated to $A_{c3}$ point or higher. However, the normalizing process may be carried out by directly holding the steel material after the hot-working process at the temperature of $A_{r3}$ point or higher. Moreover, the $A_{r3}$ point is a temperature at which the ferrite transformation starts during cooling.

When the normalizing process is carried out, the crystal grain of the steel is refined. Specifically, after the quenching in which the normalizing process is carried out, (that is, in the as-quenched material), a grain size number of prior-austenite grain becomes 10 or more which is defined in ASTM E112. Through the refinement of the crystal grain, the SSC resistance is further improved.

In the above production method, the method of producing the seamless steel pipe is explained regarding the steel material as the material pipe or the steel pipe. However, the shape of the steel material is not particularly limited. The steel material may be a plate material, a steel bar, or a wire rod.

Furthermore, in the above-described production method, the steel material having the chemical composition satisfying the Expression 2 is used and the tempering temperature is specified in order to form 5 pieces/μm² or more of the hexagonal $M_2C$ carbides having the grain size of 1 nm or more in the steel. However, 5 pieces/μm² or more of the hexagonal $M_2C$ having the grain size of 1 nm or more may be precipitated in the steel by different production conditions.

EXAMPLE 1

Ingots of steel A to steel Z and steel AA to steel AG that have chemical compositions shown in Table 1 and Table 2 were produced. In Table 2, Ms points calculated from the Expression 4 and $A_{c1}$ points calculated from the Expression 6 are shown. Moreover, in Tables, underlined values indicate out of the range of the present invention, and blanks indicate that no alloying element was intentionally added.

TABLE 1

| TYPE OF STEEL | CHEMICAL COMPOSITION (mass %, balance consisting of Fe and impurities) | | | | | | | | |
|---|---|---|---|---|---|---|---|---|---|
| | C | Si | Mn | P | S | Al | Mo | O | N |
| A | 0.50 | 0.20 | 0.44 | 0.009 | 0.001 | 0.034 | 1.47 | 0.001 | 0.0036 |
| B | 0.49 | 0.20 | 0.44 | 0.008 | 0.001 | 0.033 | 1.97 | 0.002 | 0.0036 |
| C | 0.50 | 0.20 | 0.45 | 0.009 | 0.001 | 0.031 | 2.48 | 0.001 | 0.0031 |
| D | 0.49 | 0.20 | 0.45 | 0.009 | 0.001 | 0.032 | 2.95 | 0.001 | 0.0033 |
| E | 0.50 | 0.20 | 0.44 | 0.008 | 0.001 | 0.032 | 3.44 | 0.001 | 0.0033 |
| F | 0.51 | 0.20 | 0.45 | 0.009 | 0.001 | 0.034 | 3.97 | 0.001 | 0.0033 |
| G | 0.61 | 0.21 | 0.46 | 0.008 | 0.001 | 0.037 | 2.51 | 0.001 | 0.0140 |
| H | 0.40 | 0.19 | 0.44 | 0.009 | 0.001 | 0.031 | 1.57 | 0.001 | 0.0040 |
| I | 0.39 | 0.20 | 0.44 | 0.009 | 0.001 | 0.033 | 2.02 | 0.001 | 0.0035 |
| J | 0.39 | 0.20 | 0.44 | 0.008 | 0.001 | 0.031 | 2.43 | 0.001 | 0.0040 |
| K | 0.50 | 0.20 | 0.44 | 0.008 | 0.001 | 0.034 | 1.50 | 0.001 | 0.0038 |
| L | 0.50 | 0.20 | 0.43 | 0.008 | 0.001 | 0.033 | 1.51 | 0.001 | 0.0035 |
| M | 0.60 | 0.15 | 0.60 | 0.010 | 0.001 | 0.029 | 1.15 | 0.001 | 0.0030 |
| N | 0.61 | 0.21 | 0.38 | 0.008 | 0.001 | 0.030 | 2.01 | 0.001 | 0.0041 |
| O | 0.60 | 0.20 | 0.45 | 0.009 | 0.001 | 0.034 | 2.09 | 0.001 | 0.0045 |
| P | 0.59 | 0.20 | 0.44 | 0.009 | 0.001 | 0.030 | 1.51 | 0.001 | 0.0040 |
| Q | 0.62 | 0.39 | 0.50 | 0.008 | 0.001 | 0.029 | 2.51 | 0.002 | 0.0034 |
| R | 0.56 | 0.21 | 0.40 | 0.009 | 0.001 | 0.030 | 1.10 | 0.001 | 0.0030 |
| S | 0.71 | 0.45 | 0.45 | 0.008 | 0.001 | 0.029 | 2.48 | 0.001 | 0.0041 |
| T | 0.36 | 0.19 | 0.85 | 0.009 | 0.001 | 0.034 | 1.90 | 0.001 | 0.0039 |
| U | 0.50 | 0.21 | 0.45 | 0.009 | 0.001 | 0.029 | 1.30 | 0.001 | 0.0040 |
| V | <u>0.27</u> | 0.20 | 0.45 | 0.013 | 0.003 | 0.028 | 2.47 | 0.001 | 0.0043 |
| W | 0.59 | 0.19 | <u>1.20</u> | 0.009 | 0.001 | 0.031 | 2.51 | 0.001 | 0.0044 |
| X | 0.60 | 0.40 | 0.55 | <u>0.030</u> | 0.001 | 0.029 | 2.09 | 0.001 | 0.0040 |
| Y | 0.59 | 0.45 | 0.74 | 0.010 | <u>0.011</u> | 0.030 | 2.10 | 0.001 | 0.0040 |
| Z | 0.49 | 0.20 | 0.44 | 0.008 | 0.001 | 0.033 | <u>0.70</u> | 0.001 | 0.0034 |
| AA | 0.50 | 0.20 | 0.45 | 0.008 | 0.001 | 0.033 | 1.02 | 0.001 | 0.0032 |
| AB | 0.39 | 0.20 | 0.43 | 0.008 | 0.001 | 0.031 | <u>0.69</u> | 0.001 | 0.0045 |
| AC | 0.40 | 0.20 | 0.44 | 0.008 | 0.001 | 0.032 | <u>0.99</u> | 0.001 | 0.0039 |
| AD | <u>0.27</u> | 0.20 | 0.45 | 0.011 | 0.002 | 0.036 | 1.92 | 0.001 | 0.0038 |
| AE | 0.58 | 0.19 | 0.44 | 0.012 | 0.002 | | 2.51 | <u>0.011</u> | 0.0045 |
| AF | 0.50 | 0.36 | 0.61 | 0.007 | 0.002 | 0.030 | 1.13 | 0.001 | 0.0032 |
| AG | 0.49 | 0.21 | 0.46 | 0.010 | 0.001 | 0.033 | 1.10 | 0.001 | 0.0041 |

\* In Table, underlined values indicate out of the range of the present invention.
\* In Table, a blank indicates that no alloying element was intentionally added.

TABLE 2

| TYPE OF STEEL | CHEMICAL COMPOSITION (mass %, balance consisting of Fe and impurities) | | | | | | | F2 | Ms POINT calculated (° C.) | $A_{C1}$ POINT calculated (° C.) |
|---|---|---|---|---|---|---|---|---|---|---|
| | Cr | V | Nb | Ti | Zr | Ca | B | | | |
| A | | 0.10 | 0.029 | 0.010 | | | | 0.74 | 291 | 766 |
| B | | 0.10 | 0.029 | 0.010 | | | | 0.97 | 282 | 778 |
| C | | 0.10 | 0.028 | 0.008 | | | | 1.24 | 265 | 789 |
| D | | 0.10 | 0.027 | 0.010 | | | | 1.45 | 257 | 799 |
| E | | 0.10 | 0.027 | 0.010 | | | | 1.72 | 241 | 810 |
| F | | 0.10 | 0.029 | 0.010 | | | | 2.02 | 223 | 822 |
| G | | 0.10 | 0.017 | 0.016 | | | | 1.53 | 225 | 783 |
| H | | 0.10 | 0.026 | 0.015 | | | | 0.63 | 324 | 770 |
| I | | 0.10 | 0.027 | 0.015 | | | | 0.79 | 316 | 781 |
| J | | 0.10 | 0.026 | 0.015 | | | | 0.95 | 306 | 790 |
| K | 0.20 | 0.10 | 0.028 | 0.016 | | | | 0.75 | 287 | 771 |
| L | 0.50 | 0.10 | 0.027 | 0.017 | | | | 0.76 | 282 | 779 |
| M | | | | | | | | 0.69 | 262 | 751 |
| N | 0.20 | | | | | | | 1.23 | 236 | 779 |
| O | | 0.05 | | | | | | 1.25 | 240 | 772 |
| P | | | 0.029 | | 0.030 | | | 0.89 | 259 | 769 |
| Q | | | | | | 0.0022 | | 1.56 | 217 | 787 |
| R | | | | | | | 0.0011 | 0.62 | 281 | 754 |
| S | | | 0.030 | 0.015 | | | | 1.76 | 186 | 792 |
| T | | 0.25 | 0.035 | 0.010 | | | | 0.68 | 320 | 770 |

TABLE 2-continued

| TYPE OF STEEL | CHEMICAL COMPOSITION (mass %, balance consisting of Fe and impurities) | | | | | | | Ms POINT calculated (° C.) | $A_{C1}$ POINT calculated (° C.) |
|---|---|---|---|---|---|---|---|---|---|
| | Cr | V | Nb | Ti | Zr | Ca | B | F2 | | |
| U | 0.20 | | 0.030 | 0.011 | | | | 0.65 | 295 | 759 |
| V | | 0.10 | 0.031 | 0.021 | | | 0.0010 | 0.67 | 347 | 795 |
| W | | | 0.033 | 0.010 | | | | 1.48 | 215 | 783 |
| X | | | 0.031 | 0.011 | | | | 1.25 | 233 | 785 |
| Y | | | 0.029 | 0.010 | | | | 1.24 | 231 | 783 |
| Z | | 0.10 | 0.030 | 0.010 | | | | 0.34 | 315 | 749 |
| AA | | 0.10 | 0.031 | 0.011 | | | | 0.51 | 303 | 756 |
| AB | | 0.10 | 0.026 | 0.015 | | | | 0.27 | 351 | 751 |
| AC | | 0.10 | 0.028 | 0.016 | | | | 0.40 | 339 | 758 |
| AD | | 0.10 | 0.028 | 0.014 | | | 0.0010 | 0.52 | 361 | 781 |
| AE | | | 0.025 | 0.010 | | | | 1.46 | 237 | 796 |
| AF | | 0.10 | 0.015 | 0.011 | | | | 0.57 | 293 | 757 |
| AG | | | | | | | | 0.54 | 304 | 755 |

* In Table, underlined values indicate out of the range of the present invention.
* In Table, blanks indicate that no alloying element was intentionally added.

A value that is obtained by a following Expression 7 is shown in a column of "F2" in Table 2.

$$F2 = C \times Mo \quad \text{(Expression 7)}$$

In short, F2 is the left-hand side of the Expression 2.

All of the chemical compositions of the steel A to steel U were within the range of the invention, and F2 satisfied the Expression 2. On the other hand, in the steel V to the steel Z and the steel AB to the steel AE, at least one of the amounts of the elements was out of the range of the invention. The chemical compositions of the steel AA, the steel AF, and the steel AG were within the range of the invention, but did not satisfy the Expression 2.

The weight of the respective ingots was 30 kg to 150 kg. Blocks were taken from the respective ingots. The blocks were heated to 1250° C. The heated blocks were hot-forged and hot-rolled to produce steel materials (plate materials) having a thickness of 15 mm to 25 mm.

Quenching and tempering treatments, or quenching and tempering treatments after normalizing treatment were carried out by using the produced plate materials, and the yield strength of the plate materials was controlled to 110 ksi grade (758 MPa or more) and 125 ksi grade (862 MPa or more).

In the normalizing treatment, soaking was carried out for 10 minutes at a temperature (920° C.) of $A_{c3}$ point or higher, and then cooling was conducted in air. In addition, the quenching and the tempering were carried out as follows.

[Quenching]

The quenching start temperature during the quenching was controlled to a range of 850° C. to 920° C.

[Quenching by Continuous Cooling Treatment]

In a case of carrying out the quenching by the continuous cooling treatment, after each of the plate materials was heated to the quenching start temperature, the passing time at the Ms point (time taken from the quenching start temperature to the martensite transformation start temperature (Ms point)) $T_{CC}$ (second) was controlled by shower cooling, mist cooling, or air cooling.

[Quenching including Isothermal Treatment]

In a case of carrying out the quenching including the isothermal treatment, the first cooling treatment (initial cooling) was carried out at a cooling rate of 0.7° C./s or more by salt bath cooling or water cooling. A cooling stopping temperature $AT_{IC}$ (° C.) of the initial cooling was changed by pulling up the plate material in the middle of the cooling. Holding (isothermal treatment) was carried out at the cooling stopping temperature $AT_{IC}$ for 25 minutes to 40 minutes, and then water cooling (second cooling treatment (final cooling)) was carried out to an ordinary temperature.

[Test for Quenched Material]

The following tests were carried out for the plate material after the quenching (hereinafter, referred to as a quenched material).

[Hardness Test of Quenched Material]

The hardness of the quenched material was measured by the following method. The quenched material was cut along a thickness direction. Then, the Rockwell hardness (HRC) in C scale at the thickness central portion on the cross-section was obtained based on JIS (Japanese Industrial Standard) G 0202. Specifically, the Rockwell hardness HRC was obtained at arbitrary three points at the thickness central portion of the cross-section. An average of the Rockwell hardness (HRC) obtained at the three points was defined as hardness of a corresponding mark.

[Prior Austenite Grain Size Test]

Furthermore, a prior-austenite grain size test was carried out using the quenched material. Specifically, the quenched material was cut along the thickness direction. In addition, the cut plate material was embedded in resin and polished, and then the cross-section was etched by picric acid. The etched cross-section was observed, and the grain size number of the prior-austenite grain was determined based on the ASTM E112.

[Tempering]

The tempering was carried out for the plate materials after the quenching. The yield strength of the respective plate materials was controlled to 110 ksi grade (758 MPa or more) and 125 ksi grade (862 MPa or more) by controlling a tempering temperature (° C.) and a tempering time (minutes).

[Evaluation Test for Plate Material After Tempering]

The following evaluation tests were carried out using the plate materials that were subjected to the quenching and the tempering.

[Full Width at Half Maximum Measuring Test and Fraction of Residual Austenite Measuring Test]

Test specimens were taken from the plate materials after the tempering. The surface of each of the test specimens was polished with emery paper. The finer size of the emery paper was used with proceeding the polishing. After the surface of the test specimen was polished with emery paper of No.

1200, a work-hardened layer that was formed by polishing on the surface of the test specimen was removed by immersing the test specimen in hydrogen peroxide that contained a small amount of hydrofluoric acid and was held at an ordinary temperature. X-ray diffraction test was carried out for the test specimen from which the work-hardened layer was removed under conditions of 30 kV and 100 mA using CoKα-ray (Kα1 having a wavelength of 1.7889 Å) to obtain the full width at half maximum (°) of a diffraction peak of the crystal plane corresponding to (211) crystal plane of the α phase of the test specimen.

Specifically, Kα1 and Kα2 in the CoKα-ray were separated by fitting to extract only the Kα1, and the full width at half maximum (°) diffracted by the Kα1-ray of α-Fe (211) crystal plane of the test specimens was obtained. Moreover, the full width at half maximum was measured at a height which was a half height of the peak height (peak top method). In addition, with regard to the full width at half maximum derived from a device, the full width at half maximum derived from the device was measured by using a single crystal (ideal single crystal which does not have a full width at half maximum) of LaB$_6$ (lanthanum hexaboride), and correction was carried out by subtracting the full width at half maximum derived from the device from the actually measured value.

Furthermore, the fraction of the residual austenite (volume fraction (%) of the residual austenite to the entirety) was measured by the above-described X-ray method. Specifically, test specimen, which includes the thickness central portion of the steel material, was taken. A surface of the taken test specimen was chemically polished. X-ray diffraction was carried out to the chemically polished surface using CoKα-ray (Kα1 having a wavelength of 1.7889 Å) as an incident ray. The fraction of the residual austenite was quantitatively analyzed from the integrated diffraction intensity of the crystal plane corresponding to (211) crystal plane, (200) crystal plane, and (110) crystal plane of the α phase, and the integrated diffraction intensity of (220) crystal plane, (200) crystal plane, and (111) crystal plane of austenite.

[Yield Strength Test]

From the respective plate materials after the tempering, round-bar tensile test specimens having a parallel portion with an outer diameter of 6 mm and a length of 40 mm were taken so that a tensile direction is to be a longitudinal direction or a rolling direction of the plate material. A tensile test was carried out by using the taken round-bar tensile test specimens at an ordinary temperature (25° C.) to obtain the yield strength (0.2% proof stress, in unit of MPa).

[SSC Resistance Test]

In the SSC resistance test, a constant load tensile test and an autoclave test were carried out by using the plate material having the yield strength of 125 ksi (862 MPa) or more.

[Constant Load Tensile Test]

From the respective plate materials, round-bar tensile test specimens having a parallel portion in which the tensile direction is to be the longitudinal direction or the rolling direction of the plate material were taken. The outer diameter of the parallel portion was 6.35 mm, and the length thereof was 25.4 mm. The constant load tensile test was carried out in test bath at the ordinary temperature (25° C.) based on NACE TM0177 Method A. As the test bath, A bath was used. The A bath was an aqueous solution of 5% of NaCl and 0.5% of CH$_3$COOH, which was held at the ordinary temperature and in which hydrogen sulfide gas of 1 atm was saturated.

Each of the test specimens was immersed in the A bath. A constant load that was 90% of an actual yield strength (yield strength of the respective marks) was applied to the test specimen in the A bath. Occurrence of the cracking was confirmed in the test specimen after 720 hours. The plate materials in which the cracking did not occur were judged as the plate material having excellent SSC resistance.

[Autoclave Test]

Assuming that the steel material would be used under a well environment where pressure of hydrogen sulfide would be 1 atm or higher, which would be recently required, the autocalve test was carried out by using B bath. The B bath was an aqueous solution of 5% of NaCl in which hydrogen sulfide of 10 atm was saturated. A specific test method was as follows.

Four-point bending test specimens having 2 mm×10 mm×75 mm were taken from the respective plate materials. A stress of 90% of an actual yield strength (yield strength of the respective marks) was applied to the taken four-point bending test specimens by using four-point bending jig based on ASTM G39. The four-point bending test specimen to which the stress was applied was placed in an autoclave. After the four-point bending test specimen was placed, the degassed aqueous solution of 5% of NaCl was filled into the autoclave. Thereafter, hydrogen sulfide of 10 atm was filled therein. By the above-described procedure, the B bath was prepared in the autoclave, and the four-point bending test specimen was immersed in the B bath. Occurrence of the cracking was visually confirmed in the test specimen after 720 hours from filling the hydrogen sulfide of 10 atm. The plate materials in which the cracking did not occur were judged as the plate material having excellent SSC resistance. In addition, a pressure inside the autoclave during the test was constantly controlled to be 10 atm.

[DCB Test]

DCB (Double Cantilever Beam) test specimens having a thickness of 10 mm, a width of 25 mm, and a length of 100 mm were taken from the plate materials having the yield strength of 110 ksi (758 MPa) or more. The DCB test was carried out by using the taken DCB test specimens based on NACE TM0177 Method D. As test bath, the B bath was used. Each of the DCB test specimens was immersed in the B bath for 336 hours. After 336 hours, a length of crack propagation occurred in the DCB test specimen was measured. A stress intensity factor $K_{ISSC}$ (ksi√in) was obtained based on the measured length of the crack propagation. The plate materials in which the stress intensity factor $K_{ISSC}$ (ksi√in) was 25 ksi√in or more were judged as the plate material having excellent SSC resistance.

[Result of SSC Resistance Test]

Production conditions and results of SSC resistance test are shown in Table 3 to Table 6.

TABLE 3

| MARKS | TYPE OF STEEL | C (mass %) | NORMAL-IZING | COOLING METHOD | $T_{CC}$ (sec.) | $ΔT_{IC}$ (° C.) | HARD-NESS HRC | F3 | GRAIN SIZE NUMBER |
|---|---|---|---|---|---|---|---|---|---|
| 1 | A | 0.50 | | CC | 100 | | 59.9 | 51.0 | 9.5 |
| 2 | A | 0.50 | | CC | 100 | | 59.6 | 51.0 | 9.2 |

TABLE 3-continued

| MARKS | TYPE OF STEEL | C (mass %) | NORMAL-IZING | COOLING METHOD | $T_{CC}$ (sec.) | $AT_{IC}$ (° C.) | HARD-NESS HRC | F3 | GRAIN SIZE NUMBER |
|---|---|---|---|---|---|---|---|---|---|
| 3 | A | 0.50 | Done | CC | 100 | | 60.3 | 51.0 | 11.0 |
| 4 | A | 0.50 | Done | CC | 100 | | 60.2 | 51.0 | 11.0 |
| 5 | B | 0.49 | | CC | 100 | | 59.8 | 50.5 | 9.5 |
| 6 | B | 0.49 | | CC | 100 | | 59.5 | 50.5 | 9.3 |
| 7 | B | 0.49 | Done | CC | 100 | | 60.0 | 50.5 | 11.1 |
| 8 | B | 0.49 | Done | CC | 100 | | 59.8 | 50.5 | 10.8 |
| 9 | C | 0.50 | | CC | 100 | | 58.7 | 51.0 | 9.6 |
| 10 | C | 0.50 | | CC | 100 | | 59.1 | 51.0 | 9.4 |
| 11 | C | 0.50 | Done | CC | 100 | | 59.2 | 51.0 | 10.8 |
| 12 | C | 0.50 | Done | CC | 100 | | 59.1 | 51.0 | 11.0 |
| 13 | D | 0.49 | | CC | 100 | | 58.3 | 50.5 | 9.3 |
| 14 | D | 0.49 | | CC | 100 | | 57.6 | 50.5 | 9.6 |
| 15 | D | 0.49 | Done | CC | 100 | | 57.9 | 50.5 | 11.2 |
| 16 | D | 0.49 | Done | CC | 100 | | 58.0 | 50.5 | 10.5 |
| 17 | E | 0.50 | | CC | 100 | | 57.9 | 51.0 | 9.8 |
| 18 | E | 0.50 | | CC | 100 | | 58.2 | 51.0 | 9.6 |
| 19 | E | 0.50 | Done | CC | 100 | | 57.7 | 51.0 | 11.0 |
| 20 | E | 0.50 | Done | CC | 100 | | 57.6 | 51.0 | 11.2 |
| 21 | F | 0.51 | | CC | 300 | | 57.0 | 51.5 | 9.5 |
| 22 | F | 0.51 | | CC | 300 | | 57.3 | 51.5 | 9.8 |
| 23 | F | 0.51 | Done | CC | 300 | | 57.2 | 51.5 | 10.9 |
| 24 | F | 0.51 | Done | CC | 300 | | 57.2 | 51.5 | 10.8 |
| 25 | G | 0.61 | | CC | 600 | | 61.0 | 56.5 | 9.3 |
| 26 | G | 0.61 | Done | CC | 600 | | 62.5 | 56.5 | 10.9 |
| 27 | G | 0.61 | Done | CC | 600 | | 60.5 | 56.5 | 11.0 |
| 28 | G | 0.61 | Done | CC | 600 | | 62.0 | 56.5 | 11.0 |
| 29 | G | 0.61 | | IC | | 250 | 60.5 | 56.5 | 9.5 |
| 30 | G | 0.61 | | IC | | 250 | 61.0 | 56.5 | 9.5 |
| 31 | H | 0.40 | | CC | 100 | | 54.9 | 46.0 | 9.5 |
| 32 | H | 0.40 | Done | CC | 100 | | 55.1 | 46.0 | 10.6 |
| 33 | H | 0.40 | Done | CC | 100 | | 55.6 | 46.0 | 10.7 |
| 34 | I | 0.40 | | CC | 100 | | 48.8 | 46.0 | 9.5 |
| 35 | I | 0.40 | Done | CC | 100 | | 51.0 | 46.0 | 11.1 |

TABLE 4

| MARKS | TYPE OF STEEL | C (mass %) | NORMAL-IZING | COOLING METHOD | $T_{CC}$ (sec.) | $AT_{IC}$ (° C.) | HARD-NESS HRC | F3 | GRAIN SIZE NUMBER |
|---|---|---|---|---|---|---|---|---|---|
| 36 | I | 0.40 | Done | CC | 100 | | 52.5 | 46.0 | 11.0 |
| 37 | J | 0.40 | | CC | 100 | | 52.8 | 46.0 | 9.4 |
| 38 | J | 0.40 | Done | CC | 100 | | 53.0 | 46.0 | 11.0 |
| 39 | J | 0.40 | Done | CC | 100 | | 52.6 | 46.0 | 11.2 |
| 40 | K | 0.50 | | CC | 100 | | 60.2 | 51.0 | 9.3 |
| 41 | K | 0.50 | Done | CC | 100 | | 60.3 | 51.0 | 10.8 |
| 42 | L | 0.50 | Done | CC | 100 | | 60.4 | 51.0 | 10.6 |
| 43 | M | 0.60 | | CC | 600 | | 58.5 | 56.0 | 8.6 |
| 44 | N | 0.61 | | CC | 600 | | 59.5 | 56.5 | 8.8 |
| 45 | O | 0.60 | | CC | 600 | | 60.2 | 56.0 | 8.5 |
| 46 | P | 0.59 | | CC | 600 | | 58.0 | 55.5 | 9.2 |
| 47 | Q | 0.62 | | CC | 600 | | 61.0 | 57.0 | 8.8 |
| 48 | R | 0.56 | | CC | 300 | | 57.0 | 54.0 | 8.7 |
| 49 | S | 0.71 | | IC | | 250 | 63.0 | 61.5 | 9.5 |
| 50 | T | 0.36 | | CC | 100 | | 51.0 | 44.0 | 9.6 |
| 51 | U | 0.50 | | CC | 100 | | 58.0 | 51.0 | 9.5 |
| 52 | G | 0.61 | | IC | | 250 | 62.5 | 56.5 | 9.5 |
| 53 | G | 0.61 | | IC | | 300 | 62.0 | 56.5 | 9.3 |
| 54 | A | 0.50 | | CC | <u>1000</u> | | 48.0 | 51.0 | 9.4 |
| 55 | G | 0.61 | | CC | <u>1000</u> | | 53.5 | 56.5 | 9.5 |
| 56 | G | 0.61 | | IC | | <u>400</u> | 52.0 | 56.5 | 9.4 |
| 57 | M | 0.60 | | CC | <u>1000</u> | | 51.5 | 56.0 | 9.5 |
| 58 | J | 0.40 | | CC | <u>1000</u> | | 42.0 | 46.0 | 9.3 |
| 59 | V | <u>0.27</u> | | CC | 100 | | 49.5 | 39.5 | 9.5 |
| 60 | W | 0.59 | | CC | 600 | | 58.5 | 55.5 | 9.6 |
| 61 | X | 0.60 | | CC | 600 | | 60.0 | 56.0 | 9.2 |
| 62 | Y | 0.59 | | CC | 600 | | 61.0 | 55.5 | 9.7 |
| 63 | Z | 0.49 | | CC | 100 | | 58.7 | 50.5 | 9.6 |
| 64 | AA | 0.50 | | CC | 100 | | 59.8 | 51.0 | 9.5 |
| 65 | AB | 0.40 | | CC | 100 | | 53.0 | 46.0 | 9.4 |
| 66 | AC | 0.40 | | CC | 100 | | 54.6 | 46.0 | 9.5 |
| 67 | AD | <u>0.27</u> | | CC | 100 | | 48.2 | 39.5 | 9.3 |

TABLE 4-continued

| MARKS | TYPE OF STEEL | C (mass %) | NORMAL-IZING | COOLING METHOD | $T_{CC}$ (sec.) | $AT_{IC}$ (° C.) | HARD-NESS HRC | F3 | GRAIN SIZE NUMBER |
|---|---|---|---|---|---|---|---|---|---|
| 68 | AE | 0.58 | | CC | 600 | | 59.0 | 55.0 | 9.4 |
| 69 | AF | 0.50 | | CC | 600 | | 59.5 | 51.0 | 9.6 |
| 70 | AG | 0.49 | | CC | 600 | | 59.0 | 50.5 | 9.5 |

* In Table, underlined values indicate out of the range of the present invention.

TABLE 5

| MARKS | TYPE OF STEEL | TEMPERING TEMPERATURE (° C.) | TIME (min.) | HW (°) | F1 | $M_2C$ (pieces/μm²) | YS (MPa) | SSC TEST A BATH | SSC TEST B BATH |
|---|---|---|---|---|---|---|---|---|---|
| 1 | A | 710 | 30 | 0.41 | 0.29 | 20 | 912 | None | None |
| 2 | A | 720 | 30 | 0.40 | 0.28 | 20 | 896 | None | None |
| 3 | A | 700 | 30 | 0.44 | 0.31 | 10 | 923 | None | None |
| 4 | A | 710 | 30 | 0.40 | 0.28 | 20 | 890 | None | None |
| 5 | B | 710 | 30 | 0.42 | 0.29 | 30 | 915 | None | None |
| 6 | B | 720 | 30 | 0.38 | 0.27 | 20 | 878 | None | None |
| 7 | B | 700 | 30 | 0.45 | 0.32 | 20 | 938 | None | None |
| 8 | B | 710 | 30 | 0.38 | 0.27 | 20 | 917 | None | None |
| 9 | C | 710 | 30 | 0.40 | 0.28 | 40 | 912 | None | None |
| 10 | C | 720 | 30 | 0.36 | 0.25 | 30 | 880 | None | None |
| 11 | C | 700 | 30 | 0.42 | 0.30 | 40 | 946 | None | None |
| 12 | C | 710 | 30 | 0.38 | 0.27 | 40 | 917 | None | None |
| 13 | D | 710 | 30 | 0.36 | 0.25 | 40 | 903 | None | None |
| 14 | D | 720 | 30 | 0.33 | 0.23 | 60 | 882 | None | None |
| 15 | D | 700 | 30 | 0.45 | 0.32 | 40 | 947 | None | None |
| 16 | D | 710 | 30 | 0.41 | 0.29 | 50 | 923 | None | None |
| 17 | E | 710 | 30 | 0.38 | 0.27 | 50 | 906 | None | None |
| 18 | E | 720 | 30 | 0.31 | 0.22 | 40 | 879 | None | None |
| 19 | E | 700 | 30 | 0.42 | 0.30 | 50 | 928 | None | None |
| 20 | E | 710 | 30 | 0.35 | 0.25 | 50 | 893 | None | None |
| 21 | F | 710 | 30 | 0.53 | 0.38 | 50 | 921 | None | None |
| 22 | F | 720 | 30 | 0.47 | 0.34 | 40 | 899 | None | None |
| 23 | F | 700 | 30 | 0.49 | 0.35 | 50 | 932 | None | None |
| 24 | F | 710 | 30 | 0.45 | 0.32 | 50 | 929 | None | None |
| 25 | G | 720 | 30 | 0.35 | 0.27 | 50 | 916 | None | None |
| 26 | G | 700 | 30 | 0.32 | 0.25 | 40 | 919 | None | None |
| 27 | G | 710 | 30 | 0.40 | 0.31 | 50 | 968 | None | None |
| 28 | G | 720 | 30 | 0.20 | 0.16 | 60 | 924 | None | None |
| 29 | G | 710 | 30 | 0.32 | 0.25 | 50 | 940 | None | None |
| 30 | G | 720 | 30 | 0.40 | 0.31 | 40 | 947 | None | None |
| 31 | H | 700 | 30 | 0.55 | 0.35 | 10 | 880 | None | None |
| 32 | H | 700 | 30 | 0.50 | 0.32 | 20 | 918 | None | None |
| 33 | H | 710 | 30 | 0.45 | 0.28 | 10 | 899 | None | None |
| 34 | I | 700 | 30 | 0.40 | 0.25 | 40 | 890 | None | None |
| 35 | I | 700 | 30 | 0.31 | 0.20 | 40 | 885 | None | None |

TABLE 6

| MARKS | TYPE OF STEEL | TEMPERING TEMPERATURE (° C.) | TIME (min.) | HW (°) | F1 | $M_2C$ (pieces/μm²) | YS (MPa) | SSC TEST A BATH | SSC TEST B BATH |
|---|---|---|---|---|---|---|---|---|---|
| 36 | I | 710 | 30 | 0.46 | 0.29 | 50 | 893 | None | None |
| 37 | J | 700 | 30 | 0.51 | 0.32 | 50 | 895 | None | None |
| 38 | J | 700 | 30 | 0.45 | 0.28 | 40 | 885 | None | None |
| 39 | J | 710 | 30 | 0.35 | 0.22 | 40 | 864 | None | None |
| 40 | K | 700 | 30 | 0.38 | 0.27 | 10 | 910 | None | None |
| 41 | K | 700 | 30 | 0.45 | 0.32 | 20 | 934 | None | None |
| 42 | L | 710 | 30 | 0.42 | 0.30 | 30 | 936 | None | None |
| 43 | M | 680 | 60 | 0.40 | 0.31 | 10 | 930 | None | None |

TABLE 6-continued

| | | TEMPERING | | | | | | SSC TEST | |
|---|---|---|---|---|---|---|---|---|---|
| MARKS | TYPE OF STEEL | TEMPER- ATURE (° C.) | TIME (min.) | HW (°) | F1 | $M_2C$ (pieces/$\mu m^2$) | YS (MPa) | A BATH | B BATH |
| 44 | N | 700 | 60 | 0.38 | 0.30 | 30 | 928 | None | None |
| 45 | O | 710 | 30 | 0.35 | 0.27 | 30 | 923 | None | None |
| 46 | P | 700 | 30 | 0.28 | 0.22 | 20 | 928 | None | None |
| 47 | Q | 710 | 30 | 0.40 | 0.31 | 40 | 922 | None | None |
| 48 | R | 700 | 60 | 0.30 | 0.22 | 10 | 921 | None | None |
| 49 | S | 710 | 30 | 0.45 | 0.38 | 30 | 918 | None | None |
| 50 | T | 680 | 60 | 0.50 | 0.30 | 30 | 875 | None | None |
| 51 | U | 700 | 30 | 0.37 | 0.26 | 20 | 915 | None | None |
| 52 | G | 710 | 30 | 0.38 | 0.30 | 40 | 930 | None | None |
| 53 | G | 710 | 30 | 0.40 | 0.31 | 40 | 925 | None | None |
| 54 | A | <u>640</u> | 30 | 0.56 | <u>0.40</u> | <u>0</u> | 879 | Observed | Observed |
| 55 | G | <u>630</u> | 30 | 0.51 | <u>0.40</u> | <u>0</u> | 868 | Observed | Observed |
| 56 | G | <u>620</u> | 30 | 0.52 | <u>0.41</u> | <u>0</u> | 868 | Observed | Observed |
| 57 | M | <u>600</u> | 30 | 0.55 | <u>0.43</u> | <u>0</u> | 870 | Observed | Observed |
| 58 | J | <u>600</u> | 30 | 0.65 | <u>0.41</u> | <u>0</u> | 888 | Observed | Observed |
| 59 | V | 680 | 30 | 0.55 | 0.29 | 10 | 870 | Observed | Observed |
| 60 | W | 700 | 30 | 0.42 | 0.32 | 30 | 886 | Observed | Observed |
| 61 | X | 710 | 30 | 0.38 | 0.29 | 40 | 872 | Observed | Observed |
| 62 | Y | 700 | 30 | 0.44 | 0.34 | 30 | 889 | Observed | Observed |
| 63 | Z | 710 | 30 | 0.50 | 0.35 | <u>0</u> | 870 | Observed | Observed |
| 64 | AA | 700 | 30 | 0.48 | 0.34 | <u>0</u> | 893 | Observed | Observed |
| 65 | AB | 690 | 30 | 0.58 | 0.37 | <u>0</u> | 870 | Observed | Observed |
| 66 | AC | 690 | 30 | 0.55 | 0.35 | <u>0</u> | 890 | Observed | Observed |
| 67 | AD | 690 | 30 | 0.53 | 0.28 | <u>0</u> | 877 | Observed | Observed |
| 68 | AE | 710 | 30 | 0.45 | 0.34 | 30 | 880 | Observed | Observed |
| 69 | AF | 700 | 30 | 0.52 | 0.37 | <u>0</u> | 895 | Observed | Observed |
| 70 | AG | 700 | 30 | 0.52 | 0.36 | <u>0</u> | 890 | Observed | Observed |

* In Table, underlined values indicate out of the range of the present invention.

"Done" in a "normalizing" column in Table 3 and Table 4 indicates that the normalizing treatment was carried out for the steel material of the corresponding mark. "CC" in a "cooling method" column indicates that the quenching by the continuous cooling treatment was carried out for the steel of the corresponding mark. "IC" indicates that the quenching including the isothermal treatment was carried out for the steel of the corresponding mark. In a "$T_{CC}$" column, the passing time at the Ms point $T_{CC}$ (seconds) in the continuous cooling treatment is shown. In an "$AT_{1C}$" column, the cooling stopping temperature $AT_{1C}$ (° C.) of the initial cooling in the quenching including the isothermal treatment is shown. In a "hardness HRC" column, Rockwell hardness (HRC) of the corresponding mark is shown. In a "grain size number" column, prior-austenite grain size number of the corresponding mark is shown. In an "F3" column, F3(=50 C+26) which is a value of the right-hand side of the Expression 3 is shown. In a "temperature" column and a "time" column of a "tempering" column in Table 5 and Table 6, tempering temperature (° C.) and tempering time (minute) of the corresponding mark are shown, respectively. In an "HW" column, the full width at half maximum (°) of the corresponding mark is shown. In an "F1" column, F1(=HW×$C^{1/2}$) which is a value of a left-hand side of the Expression 1 is shown. In an "$M_2C$" column, the number (pieces/$\mu m^2$) of hexagonal $M_2C$ carbides is shown. In a "YS" column, yield strength (MPa) of the corresponding mark is shown.

In an "SSC test" column, results of SSC resistance test in the A bath and the B bath are shown. "None" indicates that the cracking did not occur. "Observed" indicates that the cracking occurred.

In addition, fraction of the residual austenite of all marks 1 to 70 was 0%.

Referring to Table 3 to Table 6, it could be seen that all of the chemical compositions of the steel materials of marks 1 to 53 were within the range of the chemical composition of the low-alloy steel for oil country tubular goods of the invention. Furthermore, the F1 value was 0.38 or less, and satisfied the Expression 1 in the steel materials of the marks 1 to 53. Furthermore, the number of the hexagonal $M_2C$ carbide having the grain size (equivalent circle diameter) of 1 nm or more was 5 pieces/$\mu m^2$ or more in the steel materials of the marks 1 to 53. Furthermore, the average of aspect ratio of the grain boundary carbides was 3 or less in the steel materials of the marks 1 to 53. Therefore, the cracking was not observed in the SSC resistance test in both of the A bath and the B bath in the steel materials of the marks 1 to 53.

In addition, the grain size number of the prior-austenite grain of marks (3, 4, 7, 8, 11, 12, 15, 16, 19, 20, 23, 24, 26~28, 32, 33, 35, 36, 38, 39, 41, and 42) in which the normalizing treatment was carried out was 10 or more, and the grains thereof were refined as compared to marks in which the normalizing treatment was not carried out by using the same type of steel (for example, the mark 1 or the like in comparison with the mark 4).

On the other hand, in marks 54, 55, 57, and 58, the chemical composition was within the range of the invention, and the Expression 2 was satisfied, but the passing time at the Ms point $T_{CC}$ in the quenching by the continuous cooling treatment exceeded 600 seconds. Furthermore, the tempering temperature was lower than 680° C. Therefore, the Rockwell hardness was lower than the F3 value and did not satisfy the Expression 3 in the quenched material, and the F1 value exceeded 0.38 and did not satisfy the Expression 1. In addition, the number of the hexagonal $M_2C$ carbides having the grain size of 1 nm or more was less than 5 pieces/$\mu m^2$. Accordingly, in the marks 54, 55, 57, and 58, the cracking was observed in the SSC resistance test of both of the A bath and the B bath. In addition, the steels which were tempered at 720° C. for 30 minutes were prepared by using the steels which were quenched by the same condition as the marks 54, 55, 57, and 58. However, the yield strength of the steels was not 758 MPa or more, so that other evaluations were not conducted.

In a mark 56, the chemical composition was within the range of the invention and the Expression 2 was satisfied. However, the cooling stopping temperature $AT_{1C}$ in the quenching including the isothermal treatment was higher than 300° C. Furthermore, the tempering temperature was lower than 680° C. Therefore, the Rockwell hardness did not satisfy the Expression 3 in the quenched material, and the F1 value exceeded 0.38 and did not satisfy the Expression 1. In addition, the number of the hexagonal $M_2C$ carbides having the grain size of 1 nm or more was less than 5 pieces/μm². Accordingly, in the mark 56, the cracking was observed in the SSC resistance test of both of the A bath and the B bath.

In a mark 59, C content was less than the lower limit of the C content of the invention. Therefore, the cracking was observed in the SSC resistance test of both of the A bath and the B bath. It is assumed that the C content is insufficient, and thus grain boundary carbides are not sufficiently spheroidized.

In a mark 60, Mn content exceeded the upper limit of the invention. In a mark 61, P content exceeded the upper limit of the invention. In a mark 62, S content exceeded the upper limit of the invention. Therefore, the cracking was observed in the SSC resistance test in both of the A bath and the B bath. It is assumed that excessive Mn, P, and S segregated at grain boundaries, and thus the SSC resistance decreased.

In marks 63, 65, and 66, Mo content was less than the lower limit of the invention. Therefore, the number of the hexagonal $M_2C$ carbides having the grain size of 1 nm or more was less than 5 pieces/μm². Therefore, in the marks 63, 65, and 66, the cracking was observed in the SSC resistance test in both of the A bath and the B bath.

In marks 64, 69, and 70, the chemical composition was within the range of the invention, but the Expression 2 was not satisfied. In addition, the number of the hexagonal $M_2C$ carbides having the grain size of 1 nm or more was less than 5 pieces/μm². Therefore, in the marks 64, 69, and 70, the cracking was observed in the SSC resistance test in both of the A bath and the B bath.

In a mark 67, C content was less than the lower limit of the invention and the Expression 2 was not satisfied. Therefore, the number of the hexagonal $M_2C$ carbides having the grain size of 1 nm or more was less than 5 pieces/μm². Therefore, the cracking was observed in the SSC resistance test in both of the A bath and the B bath.

In a mark 68, Al was not included in the steel material, and O content exceeded the upper limit of the invention. Therefore, the cracking was observed in the SSC resistance test in both of the A bath and the B bath.

[Result of DCB Test]

Production conditions and results of DCB test are shown in Table 7 and Table 8. Moreover, indication method and abbreviations in Table 7 and Table 8 correspond to the Table 3 to Table 6.

TABLE 7

| MARKS | TYPE OF STEEL | C (mass %) | NORMAL-IZING | COOLING METHOD | $T_{CC}$ (sec.) | $AT_{IC}$ (° C.) | HARD-NESS HRC | F3 | GRAIN SIZE NUMBER |
|---|---|---|---|---|---|---|---|---|---|
| 71 | A | 0.50 | | CC | 100 | | 59.9 | 51.0 | 9.5 |
| 72 | B | 0.49 | | CC | 100 | | 59.8 | 50.5 | 9.5 |
| 73 | C | 0.50 | | CC | 100 | | 58.7 | 51.0 | 9.6 |
| 74 | D | 0.49 | | CC | 100 | | 58.3 | 50.5 | 9.3 |
| 75 | E | 0.50 | | CC | 100 | | 57.9 | 51.0 | 9.8 |
| 76 | F | 0.51 | | CC | 300 | | 57.0 | 51.5 | 9.5 |
| 77 | G | 0.61 | | CC | 600 | | 61.0 | 56.5 | 9.3 |
| 78 | H | 0.40 | Done | CC | 100 | | 54.9 | 46.0 | 10.9 |
| 79 | I | 0.40 | | CC | 100 | | 48.8 | 46.0 | 9.5 |
| 80 | J | 0.40 | | CC | 100 | | 52.8 | 46.0 | 9.4 |
| 81 | K | 0.50 | | CC | 100 | | 60.2 | 51.0 | 9.3 |
| 82 | L | 0.50 | Done | CC | 100 | | 60.4 | 51.0 | 10.6 |
| 83 | M | 0.60 | | CC | 600 | | 58.5 | 56.0 | 8.6 |
| 84 | N | 0.61 | | CC | 600 | | 59.5 | 56.5 | 8.8 |
| 85 | O | 0.60 | | CC | 600 | | 60.2 | 56.0 | 8.5 |
| 86 | P | 0.59 | | CC | 600 | | 58.0 | 55.5 | 9.2 |
| 87 | Q | 0.62 | | CC | 600 | | 61.0 | 57.0 | 8.8 |
| 88 | R | 0.56 | | CC | 300 | | 57.0 | 54.0 | 8.7 |
| 89 | S | 0.71 | | IC | | 250 | 63.0 | 61.5 | 9.5 |
| 90 | T | 0.36 | | CC | 100 | | 51.0 | 44.0 | 9.6 |
| 91 | U | 0.50 | | CC | 100 | | 58.0 | 51.0 | 9.5 |
| 92 | G | 0.61 | | IC | | 250 | 62.5 | 56.5 | 9.5 |
| 93 | G | 0.61 | | IC | | 300 | 62.0 | 56.5 | 9.3 |
| 94 | A | 0.50 | | CC | <u>1000</u> | | 48.0 | 51.0 | 9.4 |
| 95 | G | 0.61 | | CC | <u>1000</u> | | 53.5 | 56.5 | 9.5 |
| 96 | G | 0.61 | | IC | | <u>400</u> | 52.0 | 56.5 | 9.4 |
| 97 | J | 0.40 | | CC | <u>1000</u> | | 42.0 | 46.0 | 9.3 |

\* In Table, underlined values indicate out of the range of the present invention.

TABLE 8

| MARKS | TYPE OF STEEL | TEMPERING TEMPERATURE (° C.) | TIME (min.) | HW (°) | F1 | $M_2C$ (pieces/μm²) | YS (MPa) | $K_{ISSC}$ (ksi√in) |
|---|---|---|---|---|---|---|---|---|
| 71 | A | 730 | 30 | 0.36 | 0.25 | 20 | 830 | 25.5 |
| 72 | B | 730 | 30 | 0.37 | 0.26 | 30 | 831 | 26.4 |
| 73 | C | 730 | 30 | 0.35 | 0.25 | 40 | 825 | 30.5 |
| 74 | D | 730 | 30 | 0.31 | 0.22 | 30 | 831 | 28.5 |
| 75 | E | 730 | 30 | 0.33 | 0.23 | 40 | 826 | 29.2 |
| 76 | F | 730 | 30 | 0.42 | 0.30 | 40 | 818 | 29 |
| 77 | G | 730 | 30 | 0.30 | 0.23 | 50 | 835 | 31 |
| 78 | H | 730 | 30 | 0.40 | 0.25 | 10 | 833 | 26.4 |
| 79 | I | 730 | 30 | 0.35 | 0.22 | 40 | 820 | 26.5 |
| 80 | J | 730 | 30 | 0.41 | 0.26 | 50 | 831 | 27.5 |
| 81 | K | 730 | 30 | 0.33 | 0.23 | 20 | 805 | 29.5 |
| 82 | L | 730 | 30 | 0.37 | 0.26 | 40 | 838 | 26.8 |
| 83 | M | 730 | 30 | 0.35 | 0.27 | 10 | 856 | 27.8 |
| 84 | N | 730 | 30 | 0.33 | 0.26 | 30 | 819 | 28 |
| 85 | O | 730 | 30 | 0.30 | 0.23 | 30 | 823 | 27.7 |
| 86 | P | 730 | 30 | 0.25 | 0.19 | 20 | 808 | 29 |
| 87 | Q | 730 | 30 | 0.30 | 0.24 | 40 | 821 | 28.5 |
| 88 | R | 730 | 30 | 0.25 | 0.19 | 20 | 830 | 28.9 |
| 89 | S | 730 | 30 | 0.35 | 0.29 | 30 | 825 | 29 |
| 90 | T | 730 | 30 | 0.40 | 0.24 | 30 | 834 | 28 |
| 91 | U | 730 | 30 | 0.32 | 0.23 | 20 | 836 | 27.9 |
| 92 | G | 730 | 30 | 0.30 | 0.23 | 40 | 830 | 29.5 |
| 93 | G | 730 | 30 | 0.33 | 0.26 | 40 | 825 | 30.5 |
| 94 | A | <u>620</u> | 30 | 0.56 | <u>0.40</u> | <u>0</u> | 802 | 24.5 |
| 95 | G | <u>630</u> | 30 | 0.56 | <u>0.44</u> | <u>0</u> | 808 | 23 |
| 96 | G | <u>630</u> | 30 | 0.52 | <u>0.41</u> | <u>0</u> | 795 | 23.7 |
| 97 | J | <u>600</u> | 30 | 0.65 | <u>0.41</u> | <u>0</u> | 780 | 20.8 |

* In Table, underlined values indicate out of the range of the present invention.

In a "$K_{ISSC}$" column in Table 8, the stress intensity factor $K_{ISSC}$ (ksi√in) of the steel of the corresponding mark is shown.

Referring to Table 7 and Table 8, it could be seen that all of the chemical compositions of the steel materials of marks 71 to 93 were within the range of the chemical composition of the low-alloy steel for oil country tubular goods of the invention. Furthermore, the F1 value was 0.38 or less, and satisfied the Expression 1 in the steel materials of the mark 71 to 93. Furthermore, the number of hexagonal $M_2C$ having a grain size of 1 nm or more in the steel was 5 pieces/μm² or more in the steel materials of the marks 71 to 93. Furthermore, the average of aspect ratio of the grain boundary carbides was 3 or less in the steel materials of the marks 71 to 93. Therefore, the stress intensity factor $K_{ISSC}$ (ksi√in) of the steel materials of the marks 71 to 93 was 25 ksi√in or more. In addition, the prior-austenite grain size of the marks 78 and 82 in which the normalizing treatment was carried out was 10 or more.

On the other hand, in marks 94, 95, and 97, the chemical composition was within the range of the invention, and the Expression 2 was satisfied, but the passing time at the Ms point $T_{CC}$ in the quenching by the continuous cooling treatment exceeded 600 seconds. Furthermore, the tempering temperature was lower than 680° C. Therefore, the Rockwell hardness did not satisfy the Expression 3 in the quenched material, and the F1 value exceeded 0.38 and did not satisfy the Expression 1. In addition, the number of the hexagonal $M_2C$ carbides having the grain size of 1 nm or more was less than 5 pieces/μm². Therefore, the stress intensity factor $K_{ISSC}$ (ksi√in) of the steel materials of the marks 94, 95, and 97 was less than 25 ksi√in.

In a mark 96, the chemical composition was within the range of the invention and the Expression 2 was satisfied. However, the cooling stopping temperature $AT_{1C}$ in the quenching including the isothermal treatment was higher than 300° C. Furthermore, the tempering temperature was lower than 680° C. Therefore, the Rockwell hardness did not satisfy the Expression 3 in the quenched material, and the F1 value exceeded 0.38 and did not satisfy the Expression 1. In addition, the number of the hexagonal $M_2C$ carbides having the grain size of 1 nm or more was less than 5 pieces/μm². Therefore, the stress intensity factor $K_{ISSC}$ (ksi√in) of the steel material of the mark 96 was less than 25 ksi√in.

Hereinbefore, although the embodiment of the invention has been described, the above-described embodiment is just exemplification for performing the invention. Accordingly, the invention is not limited to the above-described embodiment, and various modifications of the above-described embodiment may be made without departing from the aspect of the invention.

INDUSTRIAL APPLICABILITY

According to the aspects of the invention, low-alloy steel for oil country tubular goods which is excellent in SSC resistance may be provided. Specifically, it is possible to provide the low-alloy steel for oil country tubular goods, which has the yield strength (0.2% proof stress) of 110 ksi grade or higher (758 MPa or more) or 125 ksi grade or higher (862 MPa or more), and which is excellent in the SSC resistance containing the SSC resistance in the environment of high pressure hydrogen sulfide and the SSC resistance in the case where the notch is applied. Thus industrial applicability is high.

REFERENCE SIGNS LIST

C10, QUENCHING PROCESS BY CONTINUOUS COOLING TREATMENT

C11, QUENCHING PROCESS INCLUDING ISOTHERMAL TREATMENT
C4, RELATIONSHIP BETWEEN COOLING RATE AND THICKNESS OF STEEL PIPE

The invention claimed is:

1. A steel for oil country tubular goods, the steel consisting of, as a chemical composition, by mass %,
C: more than 0.35% to 1.00%,
Si: 0.05% to 0.5%,
Mn: 0.05% to 1.0%,
Al: 0.005% to 0.10%,
Mo: more than 1.0% to 10%,
P: 0.025% or less,
S: 0.010% or less,
O: 0.01% or less,
N: 0.03% or less,
Cr: 0% to 2.0%,
V: 0.07% to 0.30%,
Nb: 0% to 0.1%,
Ti: 0% to 0.1%,
Zr: 0% to 0.1%,
Ca: 0% to 0.01%,
B: 0% to 0.003%, and
a balance consisting of Fe and impurities,
wherein, when a full width at half maximum of a crystal plane corresponding to a (211) crystal plane of an α phase, which is obtained by an X-ray diffraction using CoKα1, is an HW in unit of °, the full width at half maximum HW and a carbon content expressed in mass % in the chemical composition satisfy a following Expression 1,
the carbon content and a molybdenum content expressed in mass % in the chemical composition satisfy a following Expression 2,
a number of $M_2C$ carbides having a hexagonal crystal structure and having an equivalent circle diameter of 1 nm or more is 5 pieces or more per one square micron, wherein M of the $M_2C$ represents Mo, or Mo and V, and
a yield strength is 875 MPa or more, $$HW \times C^{1/2} \leq 0.38 \quad \text{(Expression 1)},$$

$$C \times Mo \geq 0.60 \quad \text{(Expression 2)}.$$

2. The steel for the oil country tubular goods according to claim 1, wherein the steel includes, as the chemical composition, by mass %, Cr :0.1% to 2.0%.

3. The steel for the oil country tubular goods according to claim 1, wherein the steel includes, as the chemical composition, by mass %, at least one of
Nb: 0.002% to 0.1%,
Ti: 0.002% to 0.1%, and
Zr: 0.002% to 0.1%.

4. The steel for the oil country tubular goods according to claim 1, wherein the steel includes, as the chemical composition, by mass %,
Ca: 0.0003% to 0.01%.

5. The steel for the oil country tubular goods according to claim 1, wherein the steel includes, as the chemical composition, by mass %,
B: 0.0003% to 0.003%.

* * * * *